(12) United States Patent
Kanamori et al.

(10) Patent No.: US 10,996,127 B2
(45) Date of Patent: May 4, 2021

(54) PRESSURE DETECTION DEVICE AND PRESSURE DETECTION SYSTEM HAVING FIRST AND SECOND HOUSINGS ELECTRICALLY INSULATED FROM EACH OTHER

(71) Applicants: CITIZEN FINEDEVICE CO., LTD., Yamanashi (JP); CITIZEN WATCH CO., LTD., Nishitokyo (JP)

(72) Inventors: Yuta Kanamori, Minamitsuru-gun (JP); Masanori Yomoyama, Minamitsuru-gun (JP); Tetsuya Aiba, Minamitsuru-gun (JP); Ikuo Takahashi, Minamitsuru-gun (JP); Hiroshi Nakagawa, Minamitsuru-gun (JP); Kazuo Takahashi, Minamitsuru-gun (JP); Yusuke Satoh, Minamitsuru-gun (JP)

(73) Assignees: CITIZEN FINEDEVICE CO., LTD., Fujikawaguchiko-machi (JP); CITIZEN WATCH CO., LTD., Nishitokyo (JP)

( * ) Notice: Subject to any disclaimer, the term of this patent is extended or adjusted under 35 U.S.C. 154(b) by 236 days.

(21) Appl. No.: 16/079,254

(22) PCT Filed: Feb. 21, 2017

(86) PCT No.: PCT/JP2017/006358
§ 371 (c)(1),
(2) Date: Aug. 23, 2018

(87) PCT Pub. No.: WO2017/146043
PCT Pub. Date: Aug. 31, 2017

(65) Prior Publication Data
US 2019/0056282 A1 Feb. 21, 2019

(30) Foreign Application Priority Data

Feb. 25, 2016 (JP) .............................. JP2016-034251
Mar. 23, 2016 (JP) .............................. JP2016-059172

(51) Int. Cl.
*G01L 23/10* (2006.01)
*G01L 19/14* (2006.01)
(Continued)

(52) U.S. Cl.
CPC ............ *G01L 23/10* (2013.01); *G01L 19/069* (2013.01); *G01L 19/0627* (2013.01); *G01L 19/14* (2013.01); *G01L 23/22* (2013.01)

(58) Field of Classification Search
None
See application file for complete search history.

(56) References Cited

U.S. PATENT DOCUMENTS

| 4,875,135 A | 10/1989 | Bishop et al. |
| 5,902,957 A | 5/1999 | Takahashi et al. |

(Continued)

FOREIGN PATENT DOCUMENTS

| CN | 102713550 A | 10/2012 |
| CN | 104169702 A | 11/2014 |

(Continued)

OTHER PUBLICATIONS

Sep. 30, 2019 Partial Search Report issued in European Patent Application No. 17756481.2.

(Continued)

*Primary Examiner* — Peter J Macchiarolo
*Assistant Examiner* — Jermaine L Jenkins
(74) *Attorney, Agent, or Firm* — Oliff PLC

(57) ABSTRACT

A pressure detection device includes: a piezoelectric element that detects a pressure change via a diaphragm head or the (Continued)

like; a circuit board that is provided with a processing circuit that performs electrical processing with respect to a charge signal outputted from the piezoelectric element; a conductive housing member, which has conductivity and is disposed to cover (house) the circuit board, and which is connected to the ground of the circuit board; and a housing (a leading end side housing, the diaphragm head and a rear end side housing), which houses the piezoelectric element, the circuit board and the housing member, and which is electrically insulated from the piezoelectric element, the circuit board and the housing member.

9 Claims, 16 Drawing Sheets

(51) Int. Cl.
*G01L 23/22* (2006.01)
*G01L 19/06* (2006.01)

(56) References Cited

U.S. PATENT DOCUMENTS

| | | | |
|---|---|---|---|
| 6,923,068 B2 | 8/2005 | Barron | |
| 7,171,846 B2* | 2/2007 | Sakamoto | F02P 19/028 73/114.18 |
| 9,222,424 B2* | 12/2015 | Takahashi | G01L 23/22 |
| 10,378,988 B2* | 8/2019 | Buck | G01L 23/26 |
| 10,458,328 B2* | 10/2019 | Takahashi | F02B 77/085 |
| 10,473,547 B2* | 11/2019 | Sato | G01L 23/10 |
| 10,578,506 B2* | 3/2020 | Yamada | G01L 23/08 |
| 2003/0200813 A1 | 10/2003 | Baba et al. | |
| 2005/0056097 A1 | 3/2005 | Banholzer et al. | |
| 2015/0034039 A1 | 2/2015 | Takahashi et al. | |
| 2016/0069765 A1 | 3/2016 | Ishikawa et al. | |
| 2017/0131169 A1 | 5/2017 | Takimoto et al. | |

FOREIGN PATENT DOCUMENTS

| | | |
|---|---|---|
| CN | 105074410 A | 11/2015 |
| JP | S55-011758 U | 1/1980 |
| JP | S58-134844 U | 9/1983 |
| JP | H07-113714 A | 5/1995 |
| JP | H09-321482 A | 12/1997 |
| JP | 2013-156171 A | 8/2013 |
| JP | 2013-205307 A | 10/2013 |
| JP | 2015-121426 A | 7/2015 |
| KR | 10-2013-0138667 A | 12/2013 |
| WO | 2015/092997 A1 | 6/2015 |
| WO | 2015/194105 A1 | 12/2015 |

OTHER PUBLICATIONS

Mar. 21, 2017 International Search Report issued in International Patent Application No. PCT/JP2017/006358.

Dec. 18, 2018 Office Action issued in Japanese Patent Application No. 2016-034251.

Mar. 16, 2020 extended Search Report issued in European Patent Application No. 17756481.2.

* cited by examiner

PRESSURE DETECTION DEVICE AND PRESSURE DETECTION SYSTEM HAVING FIRST AND SECOND HOUSINGS ELECTRICALLY INSULATED FROM EACH OTHER

TECHNICAL FIELD

The present invention relates to a pressure detection device and a pressure detection system.

BACKGROUND ART

As a device for detecting a pressure in a combustion chamber of an internal combustion engine or the like, a device using a detection element, such as a piezoelectric element, is suggested.

For example, in Patent Document 1, there is described a pressure detection device including: a cylindrical housing; a diaphragm attached to a tip end side of the housing; a piezoelectric element disposed on a rear end side of the diaphragm in the housing to detect a pressure acting via the diaphragm; a first electrode section which is provided between the diaphragm and the piezoelectric element to abut both of them in the housing; a second electrode section which is provided on a rear end side of the piezoelectric element in the housing to abut the piezoelectric element; an insulating ring which is provided on a rear end side of the second electrode section in the housing to abut the second electrode section; a support member which is provided on a rear end side of the insulating ring in the housing to abut the insulating ring; a pressure member which houses, in the housing, the first electrode section, the piezoelectric element, the second electrode section, the insulating ring and the support member inside thereof, and which is fixed to the housing to pressurize the first electrode section in the axial direction of the housing to thereby cause a load to act on the piezoelectric element.

CITATION LIST

Patent Literature

Patent Document 1: Japanese Patent Application Laid-Open Publication No. 2013-205307

SUMMARY OF INVENTION

Technical Problem

Here, if a noise enters inside the pressure detection device from the outside, the noise is superposed to the output from the detection element. Due to superposition of the noise in this manner, an error in the pressure to be detected is increased.

An object of the present invention is to suppress superposition of the noise from the outside to the output from the detection element.

Solution to Problem

A pressure detection device of the present invention includes: a detection element that detects a change in pressure; a first housing that has conductivity and houses the detection element inside thereof; and a second housing that has conductivity and houses the first housing inside thereof, wherein the first housing and the second housing are electrically insulated.

Moreover, the pressure detection device further includes an insulating member that has an insulating property and is disposed between the first housing and the second housing to electrically insulate the first housing and the second housing.

Moreover, the pressure detection device further includes a processing circuit that applies electrical processing to a detection signal detected by the detection element, wherein the processing circuit is housed in the first housing, and a ground of the processing circuit and a ground of the detection element are connected to the first housing.

Moreover, the pressure detection device further includes a DC suppressing part that connects the ground of the processing circuit and the first housing while suppressing passage of DC current.

Moreover, the second housing has the conductivity higher than that of the first housing, and the first housing has resistance to acids higher than that of the second housing.

Moreover, the first housing holds the detection element from a leading end side and a rear end side of the first housing to impart a load to the detection element, and wherein the pressure detection device further includes: a deformation member that is attached to a leading end side of the second housing and is deformed upon receiving pressure from outside; an insulating transmission member that has an insulating property and is provided between the deformation member and the detection element inside the second housing, and transmits the pressure acting on the deformation member to the detection element; and a fixing member that fixes the first housing to the second housing in a state where the first housing is electrically insulated from the deformation member and the second housing.

Moreover, the first housing shows a cylindrical shape and includes a projection part that projects outward on an outer circumferential surface thereof, and the fixing member holds the projection part with an inner circumferential surface of the second housing via the insulating member to fix the first housing to the second housing.

Moreover, the first housing includes: a first imparting member that is disposed outside the detection element, electrically connected to a leading end side of the detection element and electrically insulated from a rear end side of the detection element, to thereby impart the load from the leading end side of the detection element; and a second imparting member that is provided on a rear end side of the first imparting member, electrically connected to the first imparting member, and electrically insulated from the detection element, to thereby impart the load from the rear end side of the detection element by being fixed to the first imparting member.

Moreover, the pressure detection device further includes: a conduction member that is housed inside the first housing and is electrically connected to a rear end side of the detection element, to thereby conduct a detection signal outputted from the detection element, wherein the first housing is electrically connected to a leading end side of the detection element and is electrically insulated from the conduction member, to thereby serve as a ground of the detection element.

Moreover, from another standpoint, a pressure detection system of the present invention includes: a detection device including: a detection element that detects a change in pressure; a processing circuit that applies electrical processing to a detection signal outputted by the detection element;

an electrical conduction member that has conductivity and is disposed to cover at least a part of the processing circuit, and is connected to a ground of the processing circuit; and a housing that houses the detection element, the processing circuit and the electrical conduction member, the housing being electrically insulated from the detection element, the processing circuit and the electrical conduction member, and mounted to a grounded conductor in a state of being in contact with the conductor; and a supplying and processing device that is connected to the detection device via a supply line for supplying power-supply voltage to the processing circuit, a transmission line for transmitting an output signal outputted from the processing circuit and a ground line to be connected to the electrical conduction member or the ground of the processing circuit, and is connected to the conductor by a system different from a system via the ground line, to supply the power-supply voltage to the detection device and to apply processing to the output signal inputted from the detection device.

Moreover, from another standpoint, a pressure detection system of the present invention includes: a detection device including: a detection element that detects a change in pressure; a processing circuit that applies electrical processing to a detection signal outputted by the detection element; a first housing that has conductivity and is disposed to cover at least a part of the processing circuit, and is connected to a ground of the processing circuit; a second housing that has conductivity and houses the first housing, and is mounted in a state of being in contact with a grounded conductor; and an insulating member that has an insulating property and is disposed between the first housing and the second housing to electrically insulate the first housing and the second housing; and a supplying and processing device that is connected to the detection device via a supply line for supplying power-supply voltage to the processing circuit, a transmission line for transmitting an output signal outputted from the processing circuit and a ground line to be connected to the first housing or the ground of the processing circuit, and is connected to the conductor by a system different from a system via the ground line, to supply the power-supply voltage to the detection device and to apply processing to the output signal inputted from the detection device.

Advantageous Effects of Invention

According to the present invention, it is possible to suppress superposition of the noise from the outside to the output from the detection element.

DESCRIPTION OF EMBODIMENTS

Hereinafter, exemplary embodiments according to the present invention will be described in detail with reference to attached drawings.

Exemplary Embodiment 1

[Configuration of Pressure Detection System]

Figure 1:
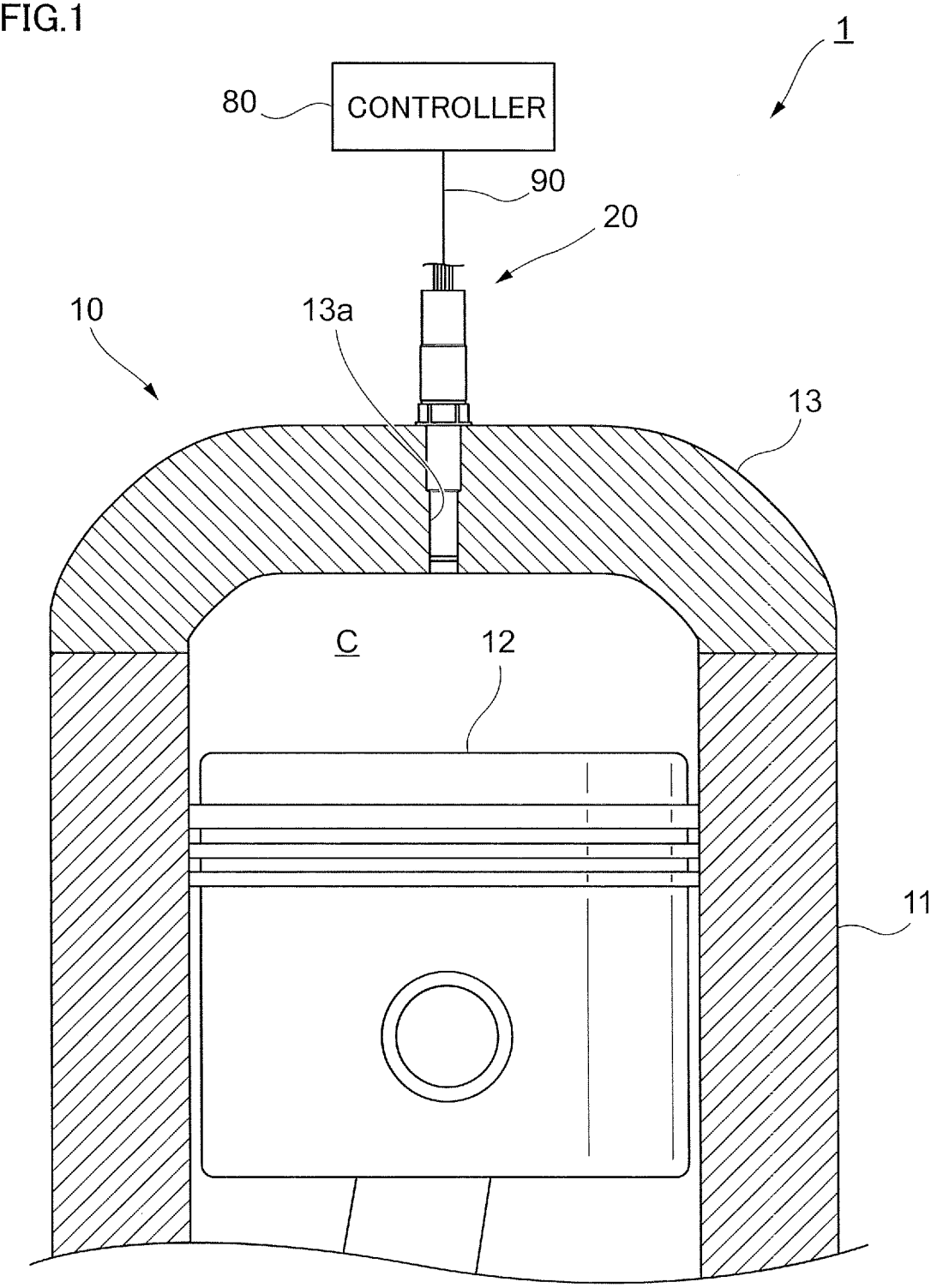
FIG. 1 is a schematic configuration view of a pressure detection system related to exemplary embodiments.

FIG. 1 is a schematic configuration view of a pressure detection system 1 related to the exemplary embodiments.

The pressure detection system 1 includes: a pressure detection device 20 that detects a pressure (combustion pressure) in a combustion chamber C in an internal combustion engine 10; a controller 80 that performs power feeding to the pressure detection device 20 and controls operation of the internal combustion engine 10 based on the pressure detected by the pressure detection device 20; and a connection cable 90 that electrically connects the pressure detection device 20 and the controller 80.

Here, the internal combustion engine 10, from which the pressure is to be detected, includes: a cylinder block 11 inside of which a cylinder is formed; a piston 12 that reciprocates inside the cylinder; and a cylinder head 13 that is fastened to the cylinder block 11 to constitute a combustion chamber C together with the piston 12 and so forth. Moreover, the cylinder head 13 is provided with a communication hole 13a that causes the combustion chamber C to be communicated with the outside. Inside the communication hole 13a, female screws (not shown) are formed to attach the pressure detection device 20 to the internal combustion engine 10 by screwing male screws (not shown) formed on an outer circumferential surface of the pressure detection device 20. Then, the cylinder block 11 that constitutes the internal combustion engine 10, the piston 12 and the cylinder head 13 are composed of a metallic material having conductivity, such as cast iron or aluminum. Note that, both end portion side of the communication hole 13a, there is provided a sealing member (not shown) interposed between the cylinder head 13 and the pressure detection device 20 to keep airtightness in the combustion chamber C.

[Configuration of Pressure Detection Device]

Figure 2:
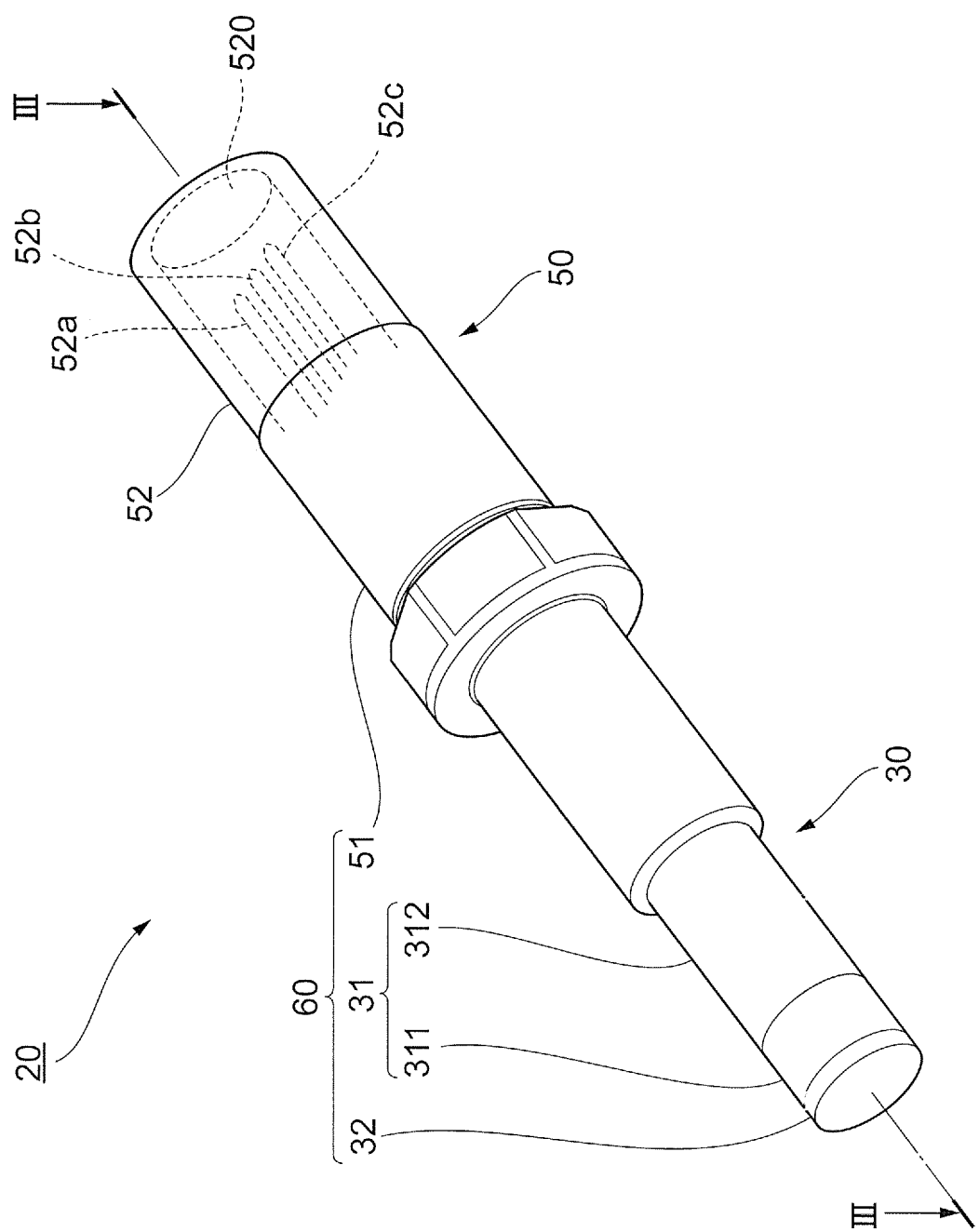
FIG. 2 is a perspective view of a pressure detection device in Exemplary embodiment 1.
Figure 3:
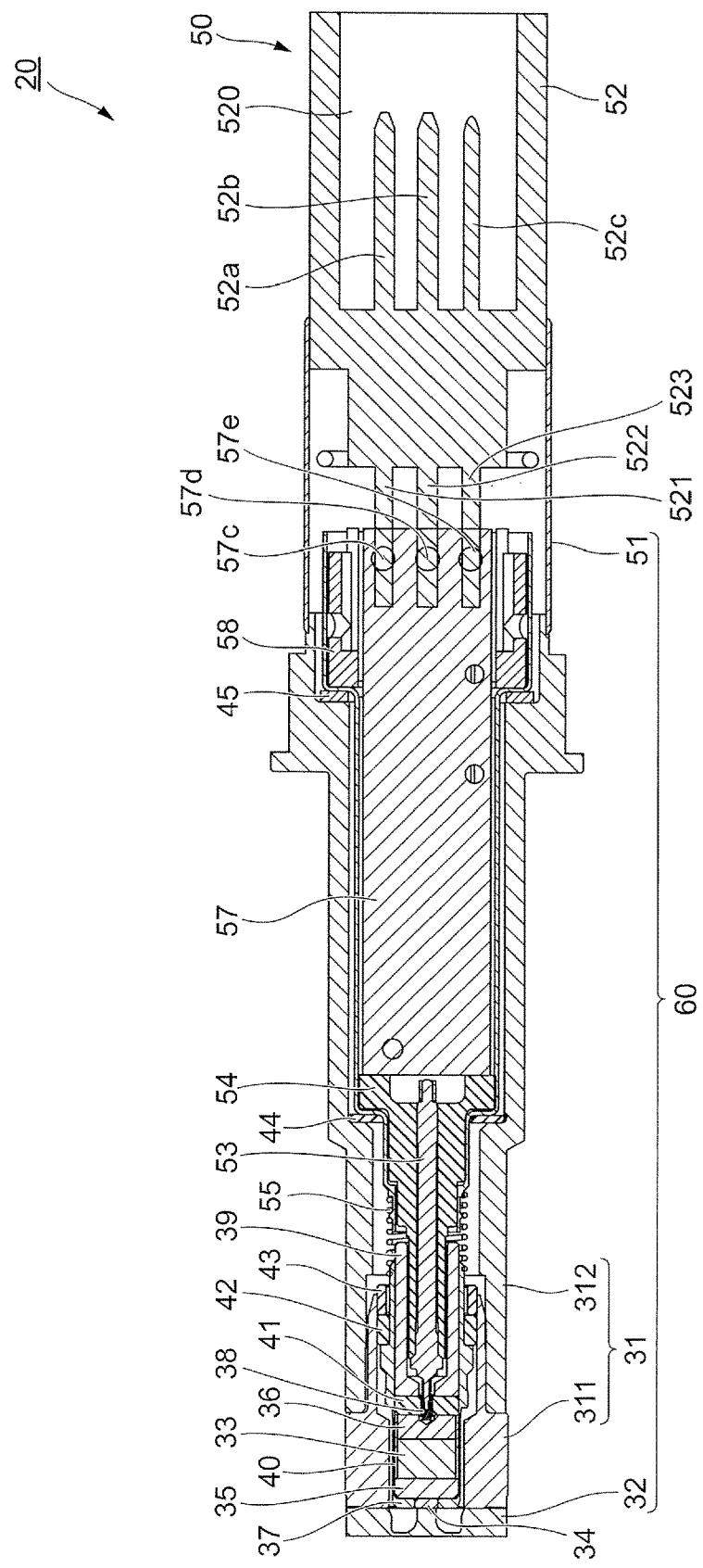
FIG. 3 is a cross-sectional view (a III-III cross-sectional view in FIG. 2) of the pressure detection device.
Figure 4:
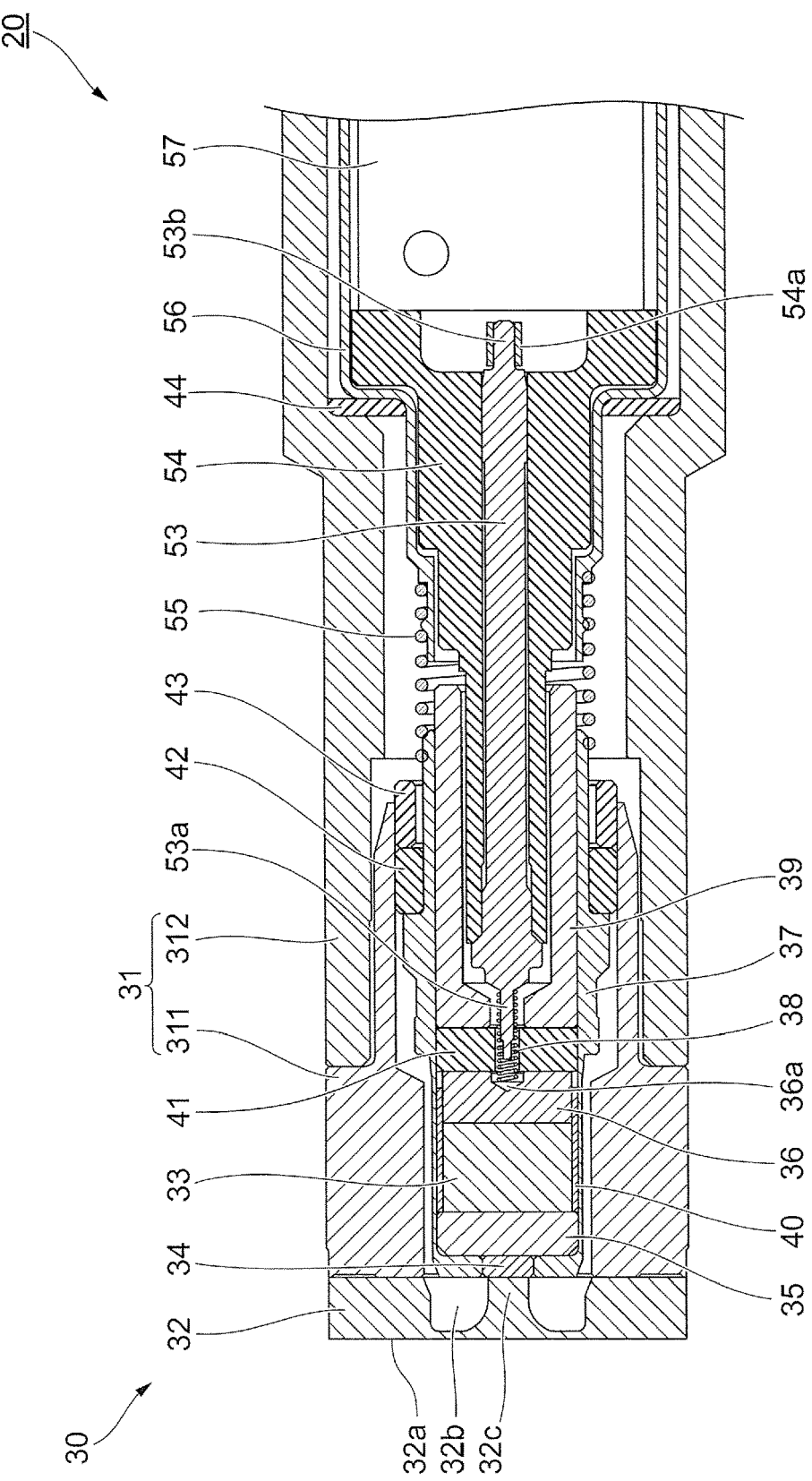
FIG. 4 is an enlarged cross-sectional view of a leading end side of the pressure detection device.

FIG. 2 is a perspective view of the pressure detection device 20 in Exemplary embodiment 1. Moreover, FIG. 3 is a cross-sectional view (a III-III cross-sectional view in FIG. 2) of the pressure detection device 20. Further, FIG. 4 is an enlarged cross-sectional view of a leading end side of the pressure detection device 20.

The pressure detection device 20 as an example of a detection device includes a detection part 30 that detects a pressure and a processing part 50 that performs various kinds of processing to electric signals obtained with detection of the pressure by the detection part 30. Then, the pressure detection device 20 is attached to the internal combustion engine 10 shown in FIG. 1 so that the detection part 30 faces the combustion chamber C (downward in FIG. 1) and the processing part 50 faces the outside (upward in FIG. 1). Note that, in the following description, in FIG. 2, a side heading for lower left in the figure (detection part 30 side) is referred to as "leading end side" of the pressure detection device 20 and a side heading for upper right in the figure (processing part 50 side) is referred to as "rear end side" of the pressure detection device 20. Moreover, in the following description, a centerline direction of the pressure detection device 20 indicated by a dot-and-dash line in FIG. 2 is simply referred to as a centerline direction.

[Configuration of Detection Part]

The detection part 30 includes a leading end side housing 31 mated with a leading end side of a rear end side housing 51 (which will be described in detail later) provided to the processing part 50 and a diaphragm head 32 attached to a leading end side of the leading end side housing 31.

Of these, the leading end side housing 31 is a member having a hollow structure and showing a cylindrical shape as a whole. The leading end side housing 31 is composed of a metallic material having conductivity and high resistance to acids, such as stainless steel. The leading end side housing 31 includes a first leading end side housing 311 that is positioned relatively close to the leading end side thereof and a second leading end side housing 312 that is positioned relatively close to the rear end side thereof. Here, by applying laser welding to an outer circumferential surface on the rear end side of the first leading end side housing 311 and an inner circumferential surface on the leading end side of the second leading end side housing 312, the leading end side housing 31 has a configuration integrating both. Then, to the leading end side of the first leading end side housing 311, the diaphragm head 32 is attached by laser welding, and, to the rear end side of the second leading end side housing 312, the rear end side housing 51 is attached by fitting. Note that, on the outer circumferential surface of the center portion in the centerline direction of the second leading end side housing 312, the male screws (not shown), which are engaged with the female screws (not shown) provided on the inner circumferential surface of the communication hole 13a (refer to FIG. 1) of the cylinder head 13, are formed.

On the other hand, the diaphragm head 32 as an example of a deformation member shows a disk shape as a whole. The diaphragm head 32 is composed of a metallic material having conductivity and high resistance to heat and acids, such as stainless steel. Particularly, in this example, the diaphragm head 32 and the above-described leading end side housing 31 are composed of the same material. The diaphragm head 32 includes: a pressure receiving surface (front surface) 32a that is exposed to the outside (combustion chamber C side) to receive a pressure; a concave part 32b that is provided by cutting a rear surface, which is the back side of the pressure receiving surface 32a in a ring shape; and a convex part 32c that projects, as a result of presence of the concave part 32b, from the center portion of the rear surface of the pressure receiving surface 32a toward the rear end side. The diaphragm head 32 is provided to close an opening part of the leading end side of the first leading end side housing 311. Then, at a boundary portion between the diaphragm head 32 and the first leading end side housing 311, laser welding is applied around the outer circumferential surface.

Moreover, the detection part 30 further includes: a piezoelectric element 33; an insulating plate 34; a leading end electrode member 35; a rear end electrode member 36; a first pressure member 37; a second pressure member 38; a support member 39; an insulating pipe 40; a first insulating ring 41; a second insulating ring 42; a third insulating ring 43; a fourth insulating ring 44; and a fifth insulating ring 45, which are disposed (housed) inside the leading end side housing 31.

The piezoelectric element 33 as an example of a detection element shows a columnar shape as a whole. The piezoelectric element 33 is provided with a piezoelectric body showing a piezoelectric action of piezoelectric longitudinal effect. The piezoelectric longitudinal effect refers to generation of charge on a surface of the piezoelectric body in the direction of a charge generating axis when an external force is applied to a stress application axis in the same direction as the charge generating axis of the piezoelectric body. The piezoelectric element 33 is disposed inside the leading end side housing 31 and on the rear end side of the diaphragm head 32. The piezoelectric element 33 is housed in the leading end side housing 31 so that the centerline direction thereof is in the same direction as the stress application axis. Here, the piezoelectric element 33 is disposed inside the insulating pipe 40 provided inside the first pressure member 37 which is provided inside the leading end side housing 31. Moreover, the outer diameter of the piezoelectric element 33 is slightly smaller than the inner diameter of the insulating pipe 40 that houses the piezoelectric element 33 inside thereof. Then, the surface on the leading end side of the piezoelectric element 33 is in contact with the surface on the rear end side of the leading end electrode member 35. On the other hand, the surface on the rear end side of the piezoelectric element 33 is in contact with the surface on the leading end side of the rear end electrode member 36. Moreover, the outer circumferential surface of the piezoelectric element 33 faces the inner circumferential surface of the insulating pipe 40.

In this manner, by providing the insulating pipe 40 between the inner circumferential surface of the first pressure member 37 and the outer circumferential surface of the piezoelectric element 33, the first pressure member 37 and the piezoelectric element 33 are not directly in contact with each other.

Next, a case in which piezoelectric transversal effect is used for the piezoelectric element 33 will be exemplified. The piezoelectric transversal effect refers to generation of charge on a surface of the piezoelectric body in the direction of a charge generating axis when an external force is applied to a stress application axis in a position orthogonal to the charge generating axis of the piezoelectric body. Plural piezoelectric bodies formed into thin plate shape may be laminated for configuration, and, by laminating in this manner, it is possible to efficiently collect charges generated in the piezoelectric body, to thereby increase sensitivity of a sensor. As the piezoelectric body that can be used for the piezoelectric element 33, use of langasite crystal (langasite, langatate, langanite, LTGA), quartz or gallium phosphate having the piezoelectric longitudinal effect and the piezoelectric transversal effect can be shown as examples. Note that, in the piezoelectric element 33 of the exemplary embodiment, langasite single crystal is used as the piezoelectric body.

The insulating plate 34 as an example of an insulating transmission member shows a disk shape as a whole. The insulating plate 34 is composed of a ceramic material having an insulating property and high resistance to heat, such as alumina. The insulating plate 34 is disposed at a position to close an opening part on the leading end side of the first pressure member 37 provided inside the leading end side housing 31. Then, the insulating plate 34 is disposed on the rear end side of the diaphragm head 32 and on the leading end side of the leading end electrode member 35. Moreover, the outer diameter of the insulating plate 34 is slightly smaller than the inner diameter of the opening part provided to the leading end side of the first pressure member 37, and is slightly larger than the outer diameter of the convex part 32c of the diaphragm head 32. Then, the surface on the leading end side of the insulating plate 34 is in contact with the convex part 32c of the diaphragm head 32. On the other hand, the surface on the rear end side of the insulating plate 34 is in contact with the surface on the leading end side of the leading end electrode member 35. Moreover, the outer circumferential surface of the insulating plate 34 faces the inner circumferential surface of the opening part provided to the leading end side of the first pressure member 37.

The leading end electrode member 35 shows a columnar shape as a whole. The leading end electrode member 35 is composed of a metallic material having conductivity and high resistance to heat, such as stainless steel. The leading end electrode member 35 is disposed inside the first pressure member 37 provided inside the leading end side housing 31. However, different from the above-described piezoelectric element 33, the leading end electrode member 35 is not housed inside the insulating pipe 40. Then, the leading end electrode member 35 is disposed on the rear end side of the insulating plate 34 and on the leading end side of the piezoelectric element 33. Moreover, the outer diameter of the leading end electrode member 35 is slightly smaller than the inner diameter of the first pressure member 37 that houses the leading end electrode member 35 inside thereof. Then, the surface on the leading end side of the leading end electrode member 35 is in contact with the surface on the rear end side of the insulating plate 34 and the surface on the back side of the opening part provided to the leading end side of the first pressure member 37. On the other hand, the surface on the rear end side of the leading end electrode member 35 is in contact with the surface on the leading end side of the piezoelectric element 33. Moreover, the outer circumferential surface of the leading end electrode member 35 faces the inner circumferential surface of the first pressure member 37.

The rear end electrode member 36 shows a columnar shape as a whole. The rear end electrode member 36 is composed of a metallic material having conductivity and high resistance to heat, such as stainless steel. The rear end electrode member 36 is disposed inside the first pressure member 37 provided inside the leading end side housing 31. Here, the leading end side of the rear end electrode member 36 is disposed inside the insulating pipe 40 provided inside the first pressure member 37. In contrast thereto, the rear end side of the rear end electrode member 36 is disposed outside the insulating pipe 40. At the center portion on the surface of the rear end side in the rear end electrode member 36, a countersunk hole 36a for inserting the leading end side of the second pressure member 38 is formed. Moreover, the outer diameter of the rear end electrode member 36 is substantially the same as the outer diameter of the piezoelectric element 33 and is slightly smaller than the inner diameter of the insulating pipe 40. Then, the surface on the leading end side of the rear end electrode member 36 is in contact with the surface on the rear end side of the piezoelectric element 33. On the other hand, the surface of the rear end side of the rear end electrode member 36 is in contact with the surface on the leading end side of the first insulating ring 41, and the bottom surface of the countersunk hole 36a provided to the rear end side of the rear end electrode member 36 is in contact with the leading end side of the second pressure member 38. Moreover, the leading end side of the outer circumferential surface of the rear end electrode member 36 faces the inner circumferential surface of the insulating pipe 40. In contrast thereto, the rear end side of the outer circumferential surface of the rear end electrode member 36 faces the inner circumferential surface of the first pressure member 37 via an air gap. In this manner, by providing the insulating pipe 40 and the air gap between the inner circumferential surface of the first pressure member 37 and the outer circumferential surface of the rear end electrode member 36, the first pressure member 37 and the rear end electrode member 36 are not directly in contact with each other.

The first pressure member 37 shows a cylindrical shape as a whole. The first pressure member 37 is composed of a metallic material having conductivity and high resistance to heat, such as stainless steel. The first pressure member 37 is provided inside the leading end side housing 31 and the insulating plate 34 is disposed to close the opening part provided to the leading end side thereof, and the first pressure member 37 houses the piezoelectric element 33, the leading end electrode member 35, the rear end electrode member 36, the second pressure member 38, the leading end side of the support member 39, the insulating pipe 40 and the first insulating ring 41 inside thereof. Then, the first pressure member 37 is disposed on the rear end side of the diaphragm head 32 and on the leading end side of a buffer member 55 (which will be described in detail later) constituting the processing part 50. Moreover, the outer diameter of the first pressure member 37 differs depending on the position in the centerline direction; however, at all the positions, the outer diameter of the first pressure member 37 is smaller than the inner diameter of the leading end side housing 31 (more specifically, the first leading end side housing 311). Further, the inner diameter of the first pressure member 37 is, at the positions facing the insulating plate 34, the leading end electrode member 35, the insulating pipe 40 (the piezoelectric element 33 and the rear end electrode member 36) and the first insulating ring 41, larger than the outer diameters of these components, and at the position facing the support member 39, slightly smaller than the outer diameter of the support member 39. Here, between the outer circumferential surface on the rear end side of the first pressure member 37 and the inner circumferential surface on the rear end side of the first leading end side housing 311, the second insulating ring 42 is disposed at a position relatively on the leading end side, and the third insulating ring 43 is disposed at a position relatively on the rear end side. Then, the surface of the leading end side (surface on the front side of the opening part) of the first pressure member 37 faces the convex part 32b provided to the rear end side of the diaphragm head 32. On the other hand, the rear end side of the first pressure member 37 is in contact with the leading end side of the buffer member 55. Moreover, the rear end side of the outer circumferential surface of the first pressure member 37 is in contact with the inner circumferential surface of the second insulating ring 42, and the rearmost end side thereof faces the third insulating ring 43 via the air gap. Further, the leading end side of the outer circumferential surface of the first pressure member 37 faces the inner circumferential surface of the first leading end side housing 311 via the air gap. In this manner, by providing the air gap formed by the concave part 32b between the surface on the leading end side of the first pressure member 37 and the rear surface of the diaphragm head 32, and by providing the second insulating ring 42 between the outer circumferential surface of the first pressure member 37 and the inner circumferential surface of the first leading end side housing 311 of the leading end side housing 31, the leading end side housing 31, the diaphragm head 32 and the first pressure member 37 are not directly in contact with one another. In contrast thereto, the inner circumferential surface of the first pressure member 37 is directly in contact with the outer circumferential surface of each of the leading end electrode member 35, the insulating pipe 40, the first insulating ring 41 and the support member 39. Moreover, the inner circumferential surface of the first pressure member 37 is not directly in contact with the outer circumferential surface of each of the piezoelectric element 33 and the rear end electrode member 36.

The second pressure member 38 shows a spiral shape as a whole, and is a coil spring expanding and contracting in the centerline direction. The second pressure member 38 is composed of a metallic material having conductivity, which is higher than the conductivity of the leading end side housing 31, such as brass. The second pressure member 38 is disposed inside the first pressure member 37 provided inside the leading end side housing 31 to pass through the support member 39 and the first insulating ring 41 positioned inside the first pressure member 37 to reach the countersunk hole 36a of the rear end electrode member 36. Then, the second pressure member 38 is disposed on the rear end side of the rear end electrode member 36 and on a leading end side of a conduction member 53 (which will be described in detail later) provided to the processing part 50. Moreover, the outer diameter of the second pressure member 38 is smaller than the inner diameter of the opening part provided on the leading end side of the support member 39, the inner diameter of a through hole provided to the first insulating ring 41 and the inner diameter of the countersunk hole 36a of the rear end electrode member 36. Further, the inner diameter of the second pressure member 38 is larger than an outer diameter of a leading end side convex part 53a (which will be described in detail later) provided on the leading end side of the conduction member 53. Then, the leading end side of the second pressure member 38 is in contact with the rear end electrode member 36 by being inserted into the countersunk hole 36a of the rear end electrode member 36. On the other hand, the rear end side of the second pressure member 38 is in contact with the conduction member 53 due to insertion of the leading end side convex part 53a of the conduction member 53. Moreover, the leading end side on the outer circumferential surface of the second pressure member 38 faces the inner circumferential surface of the countersunk hole 36a of the rear end electrode member 36 and the inner circumferential surface of the through hole of the first insulating ring 41. Further, the rear end side on the outer circumferential surface of the second pressure member 38 faces the inner circumferential surface of the support member 39 via the air gap. In this manner, by providing the air gap between the inner circumferential surface of the support member 39 and the second pressure member 38, the support member 39 and the second pressure member 38 are not directly in contact with each other.

The support member 39 shows a cylindrical shape as a whole. The support member 39 is composed of a metallic material having conductivity and high resistance to heat, such as stainless steel. The support member 39 is disposed inside the leading end side housing 31, and the leading end side thereof is positioned inside the first pressure member 37 and the rear end side thereof is positioned outside the first pressure member 37. Moreover, the support member 39 houses the rear end side of the second pressure member 38 inside thereof, and also houses the leading end side of conduction member 53 and covering member 54 (which will be described in detail later) positioned on the leading end side of the processing part 50. Then, the support member 39 is disposed on the rear end side of the first insulating ring 41 and on the leading end side of a housing member 56 (which will be described in detail later) constituting the processing part 50. Moreover, the outer diameter of the support member 39 is slightly larger than the inner diameter of the first pressure member 37. Further, the inner diameter of the support member 39 differs depending on the position in the centerline direction; however, at all the positions, the inner diameter of the support member 39 is larger than the outer diameters of the conduction member 53 and the covering member 54 provided to the processing part 50. Then, the surface of the leading end side (surface on the front side of the opening part) of the support member 39 is in contact with the surface on the rear end side of the first insulating ring 41. On the other hand, the surface on the rear end side of the support member 39 faces the covering member 54 via the air gap. Moreover, the outer circumferential surface of the support member 39 is in contact with the inner circumferential surface of the first pressure member 37. Further, the inner circumferential surface of the support member 39 faces the second pressure member 38, the conduction member 53 and the covering member 54 via the air gap. In this manner, by providing the air gap between the inner circumferential surface of the support member 39 and the second pressure member 38, the conduction member 53 and the covering member 54, the support member 39 is not directly in contact with the second pressure member 38, the conduction member 53 and the covering member 54.

The insulating pipe 40 shows a cylindrical shape as a whole. The insulating pipe 40 is composed of a synthetic resin material having an insulating property, such as LCP (Liquid Crystal Polymer). The insulating pipe 40 is disposed inside the first pressure member 37 provided inside the leading end side housing 31. The insulating pipe 40 houses the leading end side of the piezoelectric element 33 and the rear end electrode member 36 inside thereof. Then, the insulating pipe 40 is disposed on the rear end side of the rear end electrode member 35 and on the leading end side of the first insulating ring 41. Moreover, the outer diameter of the insulating pipe 40 is slightly smaller than the inner diameter of the first pressure member 37. Further, the inner diameter of the insulating pipe 40 is slightly larger than the outer diameter of each of the piezoelectric element 33 and the rear end electrode member 36. Then, the leading end side of the insulating pipe 40 faces the surface on the rear end side of the leading end electrode member 35. On the other hand, the rear end side of the insulating pipe 40 faces the surface on the leading end side of the first insulating ring 41. Moreover, the outer circumferential surface of the insulating pipe 40 faces the inner circumferential surface of the first pressure member 37. Moreover, the inner circumferential surface of the insulating pipe 40 faces the outer circumferential surface of each of the piezoelectric element 33 and the outer circumferential surface of the rear end electrode member 36. In this manner, by providing the insulating pipe 40 and the air gap formed by the insulating pipe 40 between the first pressure member 37 and the piezoelectric element 33 and the rear end electrode member 36, the first pressure member 37 is not directly in contact with the piezoelectric element 33 and the rear end electrode member 36.

The first insulating ring 41 shows an annular shape as a whole. The first insulating ring 41 is composed of a ceramic material having an insulating property and high resistance to heat, such as alumina. The first insulating ring 41 is disposed inside the first pressure member 37 provided inside the leading end side housing 31. At the center portion of the first insulating ring 41, a through hole that penetrates through the first insulating ring 41 is formed along the centerline direction. Moreover, the outer diameter of the first insulating ring 41 is slightly smaller than the inner diameter of the first pressure member 37. Further, the inner diameter of the through hole in the first insulating ring 41 is slightly larger than the outer diameter of the second pressure member 38. Then, the surface on the leading end side of the first insulating ring 41 is in contact with the surface on the rear end side of the rear end electrode member 36. On the other hand, the surface on the rear end side of the first insulating ring 41 is in contact with the surface on the leading end side of the support member 39. Moreover, the outer circumferential surface of the first insulating ring 41 faces the inner circumferential surface of the first pressure member 37. Further, the inner circumferential surface of the first insulating ring 41 faces the outer circumference of the second pressure member 38.

The second insulating ring 42 shows an annular shape as a whole. The second insulating ring 42 is composed of a ceramic material having an insulating property and high resistance to heat, such as alumina. The second insulating ring 42 is disposed inside the leading end side housing 31 and on the rear end side and outside the first pressure member 37. At the center portion of the second insulating ring 42, a through hole that penetrates through the second insulating ring 42 is formed along the centerline direction. Moreover, the outer diameter of the second insulating ring 42 is slightly larger than the inner diameter of the leading end side housing 31 (more specifically, the first leading end side housing 311). Further, the inner diameter of the second insulating ring 42 is slightly smaller than the outer diameter of the first pressure member 37. Then, the surface on the leading end side of the second insulating ring 42 is in contact with a surface on a rear end side of a projection part that projects from the outer circumferential surface of the first pressure member 37 toward the outside. On the other hand, the surface on the rear end side of the second insulating ring 42 is in contact with the surface on the leading end side of the third insulating ring 43. Moreover, the outer circumferential surface of the second insulating ring 42 is in contact with the inner circumferential surface of the leading end side housing 31. Further, the inner circumferential surface of the second insulating ring 42 is in contact with the outer circumferential surface of the first pressure member 37.

The third insulating ring 43 shows an annular shape as a whole. The third insulating ring 43 is composed of a ceramic material having an insulating property and high resistance to heat, such as alumina. The third insulating ring 43 is disposed inside the leading end side housing 31 and outside the first pressure member 37. At the center portion of the third insulating ring 43, a through hole that penetrates through the third insulating ring 43 is formed along the centerline direction. Moreover, the outer diameter of the third insulating ring 43 is slightly larger than the inner diameter of the leading end side housing 31 (more specifically, the first leading end side housing 311). Further, the inner diameter of the third insulating ring 43 is larger than the outer diameter of the first pressure member 37, and larger than the inner diameter of the second insulating ring 42. Then, the surface on the leading end side of the third insulating ring 43 is in contact with the surface on the rear end side of the second insulating ring 42. On the other hand, the surface on the rear end side of the third insulating ring 43 faces the air gap provided to the rear end side of the third insulating ring 43. Moreover, the outer circumferential surface of the third insulating ring 43 is in contact with the inner circumferential surface of the leading end side housing 31. Further, the inner circumferential surface of the third insulating ring 43 faces the outer circumferential surface of the first pressure member 37 via the air gap.

The fourth insulating ring 44 as an example of an insulating member shows an annular shape as a whole. The fourth insulating ring 44 is composed of a ceramic material having an insulating property and high resistance to heat, such as alumina. The fourth insulating ring 44 is disposed inside the leading end side housing 31 (more specifically, the second leading end side housing 312) and on the rear end side and outside of the housing member 56 (which will be described in detail later) provided to the processing part 50. At the center portion of the fourth insulating ring 44, a through hole that penetrates through the fourth insulating ring 44 is formed along the centerline direction. Moreover, the outer diameter of the fourth insulating ring 44 is slightly larger than the inner diameter of the leading end side housing 31. Further, the inner diameter of the fourth insulating ring 44 is slightly smaller than the outer diameter of the housing member 56. Then, the surface on the leading end side of the fourth insulating ring 44 is in contact with the inner circumferential surface of the leading end side housing 31. On the other hand, the surface on the rear end side of the fourth insulating ring 44 is in contact with the outer circumferential surface of the housing member 56. Moreover, the outer circumferential surface of the fourth insulating ring 44 is in contact with the inner circumferential surface of the leading end side housing 31. Further, the inner circumferential surface of the fourth insulating ring 44 is in contact with the outer circumferential surface of the housing member 56.

The fifth insulating ring 45 as an example of the insulating member shows an annular shape as a whole. The fifth insulating ring 45 is composed of a ceramic material having an insulating property and high resistance to heat, such as alumina. The fifth insulating ring 45 is disposed inside the leading end side housing 31 (more specifically, the second leading end side housing 312) and outside the housing member 56 (which will be described in detail later) provided to the processing part 50. At the center portion of the fifth insulating ring 45, a through hole that penetrates through the fifth insulating ring 45 is formed along the centerline direction. Moreover, the outer diameter of the fifth insulating ring 45 is slightly larger than the inner diameter of the leading end side housing 31. Further, the inner diameter of the fifth insulating ring 45 is slightly smaller than the outer diameter of the housing member 56. Then, the surface on the leading end side of the fifth insulating ring 45 is in contact with the inner circumferential surface of the leading end side housing 31. On the other hand, the surface on the rear end side of the fifth insulating ring 45 is in contact with the outer circumferential surface of the housing member 56. Moreover, the outer circumferential surface of the fifth insulating ring 45 is in contact with the inner circumferential surface of the leading end side housing 31. Further, the inner circumferential surface of the fifth insulating ring 45 is in contact with the outer circumferential surface of the housing member 56.

In this manner, by providing the fourth insulating ring 44 and the fifth insulating ring 45 between the leading end side housing 31 and the housing member 56 constituting the processing part 50, the leading end side housing 31 and the housing member 56 are not directly in contact with each other.

[Configuration of Processing Part]

The processing part 50 includes: the rear end side housing 51 mated with the above-described leading end side housing 31 (more specifically, the second leading end side housing 312); and a connection member 52 provided so that the leading end side thereof is housed inside the rear end side of the rear end side housing 51 and the rear end side thereof is exposed to the outside of the rear end side of the rear end side housing 51 to be connected to the connection cable 90 (refer to FIG. 1).

Of these, the rear end side housing 51 is a member having a hollow structure and showing a cylindrical shape as a whole. The rear end side housing 51 is composed of a metallic material having conductivity and high resistance to acids, such as stainless steel. Then, to the leading end side of the rear end side housing 51, the rear end side of the leading end side housing 31 (specifically, the second leading end side housing 312) is attached by fitting, and, to the rear end side of the rear end side housing 51, the connection member 52 is attached by setting in.

On the other hand, the connection member 52 shows a columnar shape as a whole. The connection member 52 includes a base material composed of a synthetic resin material having an insulating property, such as PPT (Polypropylene Terephthalate), wiring composed of a metallic material having conductivity, such as copper, terminals, and so forth. However, of the connection member 52, the portion (the outer circumferential surface) to be brought into contact with the above-described rear end side housing 51 is composed of the synthetic resin material, to thereby prevent a metallic material from being exposed in the portion (from being brought into contact with the connection member 52). Moreover, on the leading end side of the connection member 52, a first substrate side terminal 521, a second substrate side terminal 522 and a third substrate side terminal 523, each of which serves as an electrical connection terminal, are provided to project toward the leading end side. In contrast thereto, on the rear end side of the connection member 52, an opening part 520 having a concave shape and opening toward the rear end side is formed. Then, inside the opening part 520, a first connection terminal 52*a*, a second connection terminal 52*b* and a third connection terminal 52*c* to be connected to the connection cable 90 (refer to FIG. 1) are provided to project toward the rear end side. Here, the first substrate side terminal 521, the second substrate side terminal 522 and the third substrate side terminal 523 are electrically connected to the first connection terminal 52*a*, the second connection terminal 52*b* and the third connection terminal 52*c*, respectively.

Moreover, the processing part 50 further includes: the conduction member 53; the covering member 54; the buffer member 55; the housing member 56; the circuit board 57 and a holding member 58, which are disposed (housed) inside the leading end side housing 31 and/or the rear end side housing 51.

The conduction member 53 shows a rod shape as a whole. The conduction member 53 is composed of a metallic material having conductivity, such as brass. The conduction member 53 is provided with, at the leading end thereof, the leading end side convex part 53*a* having a diameter smaller than that of the center portion in the centerline direction, and at the rear end thereof, the rear end side convex part 53*b* having a diameter smaller than that of the center portion in the centerline direction. The support member 53 is disposed inside the leading end side housing 31, and the leading end side thereof is positioned inside the first pressure member 37, the rear end side thereof is positioned inside the housing member 56, and a middle portion thereof between the leading end side and the rear end side is positioned inside the buffer member 55. Then, the conduction member 53 is disposed on the rear end side of the second pressure member 38 and on the leading end side of the circuit board 57. Moreover, the outer diameter of the leading end side convex part 53*a* of the conduction member 53 is slightly larger than the inner diameter of the second pressure member 38. Further, the outer diameter of the rear end side convex part 53*b* of the conduction member 53 is substantially the same as an inner width of a rear end holding part 54*a* (which will be described in detail later) provided to the covering member 54. Still further, the outer diameter of the center portion of the conduction member 53 in the centerline direction is substantially the same as the inner diameter of the covering member 54. The conduction member 53 is disposed to penetrate through the through hole provided to the covering member 54 along the centerline direction; the leading end side convex part 53*a* projects toward the leading end side of the leading end of the covering member 54 and the rear end side convex part 53*b* projects toward the rear end side than the concave part provided to the rear end side of the covering member 54. Then, the leading end side convex part 53*a* of the conduction member 53 is in contact with the second pressure member 38 by being inserted into the inside of the second pressure member 38. On the other hand, the rear end side convex part 53*b* of the conduction member 53 is set into the rear end holding part 54*a* provided to the covering member 54. Moreover, the outer circumferential surface of the center portion of the conduction member 53 in the centerline direction is in contact with the inner circumferential surface of the covering member 54.

The covering member 54 shows a cylindrical shape as a whole. The covering member 54 includes a base material composed of a synthetic resin material having an insulating property, such as PPT, wiring composed of a metallic material having conductivity, such as copper, terminals, and so forth. However, of the covering member 54, the portion (the outer circumferential surface) facing the support member 39, the buffer member 55 and the housing member 56 is composed of the synthetic resin material, to thereby prevent a metallic material from being exposed in the portion. Moreover, on the rear end side of the covering member 54, the rear end holding part 54*a*, which is composed of a metallic material and sets the rear end side convex part 53*b* of the conduction member 53 in to hold thereof, is provided. The covering member 54 is disposed inside the leading end side housing 31, and the leading end side thereof is positioned inside the first pressure member 37, the rear end side thereof is positioned inside the housing member 56, and a middle portion thereof between the leading end side and the rear end side is positioned inside the buffer member 55. Then, the covering member 54 is disposed on the rear end side of the second pressure member 38 and on the leading end side of the circuit board 57. The outer circumferential surface of the covering member 54 has a shape in which the outer diameter increases in a stepwise manner from the leading end side toward the rear end side. At the center portion of the covering member 54, a through hole that penetrates through the covering member 54 is formed along the centerline direction. Moreover, the outer diameter on the leading end side of the covering member 54 is smaller than the inner diameter of the support member 39 and the outer diameter on the rear end side of the covering member 54 is smaller than the inner diameter of the housing member 56. Further, the inner diameter of the covering member 54 is substantially the same as the outer diameter of the center portion of the conduction member 53 in the centerline direction. Then, the leading end of the covering member 54 is in contact with a rear end of a bulging part provided to the leading end side of the conduction member 53 and having the outer diameter slightly larger than that of the center portion of the conduction member 53 in the centerline direction. On the other hand, the rear end of the covering member 54 is in contact with the leading end of the circuit board 57. Moreover, the outer circumferential surface of the covering member 54 faces the inner circumferential surface of the support member 39 via the air gap. Further, the inner circumferential surface of the covering member 54 is in contact with the conduction member 53.

The buffer member 55 shows a spiral shape as a whole, and is a coil spring expanding and contracting in the centerline direction. The buffer member 55 is composed of a metallic material having conductivity, such as brass. The buffer member 55 is disposed inside the leading end side housing 31, and the leading end side thereof is positioned outside the first pressure member 37 and the rear end side thereof is positioned outside the housing member 56. In other words, the buffer member 55 is disposed over the first pressure member 37 and the housing member 56. Moreover, the outer diameter of the buffer member 55 is smaller than the inner diameter of the leading end side housing 31 (specifically, the first leading end side housing 312). Further, the inner diameter of the buffer member 55 is slightly smaller than the outer diameter of the rear end of the first pressure member 37 and the outer diameter of the leading end side of the housing member 56. Then, the outer circumference of the buffer member 55 faces the leading end side housing 31 via the air gap. On the other hand, the inner circumference of the leading end side of the buffer member 55 is in contact with the outer circumferential surface on the rear end side of the first pressure member 37, and the inner circumference of the rear end side of the buffer member 55 is in contact with the outer circumferential surface on the leading end side of the housing member 56. In this manner, by providing the air gap between the outer circumference of the buffer member 55 and the inner circumferential surface of the leading end side housing 31, the buffer member 55 and the leading end side housing 31 are not directly in contact with each other.

The housing member 56 as an example of a first housing shows a cylindrical shape as a whole. The housing member 56 is composed of a metallic material having conductivity, such as brass. The housing member 56 is provided over the inner portion of the leading end side housing 31 and the inner portion of the rear end side housing 51. Then, the housing member 56 is disposed on the rear end side of the first pressure member 37 and on the leading end side of the connection member 52. The outer circumferential surface and the inner circumferential surface of the housing member 56 have a shape in which the outer diameter and the inner diameter increase in a stepwise manner from the leading end side toward the rear end side. At the center portion of the housing member 56, a through hole that penetrates through the housing member 56 is formed along the centerline direction. Moreover, the outer diameter on the leading end side of the housing member 56 is smaller than the inner diameter of the leading end side housing 31 and the outer diameter on the rear end side of the housing member 56 is smaller than the inner diameter of the rear end side housing 51. Here, between the outer circumferential surface of the housing member 56 and the inner circumferential surface of the leading end side housing 31, the fourth insulating ring 44 is disposed at a position relatively on the leading end side, and the fifth insulating ring 45 is disposed at a position relatively on the rear end side. Further, the inner diameter on the leading end side of the housing member 56 is larger than the outer diameter of the covering member 54, the inner diameter on the rear end side of the housing member 56 is slightly smaller than the outer diameter of the holding member 58, and the inner diameter of the middle portion positioned between the leading end side and the rear end side of the housing member 56 is slightly larger than the outer diameter of the circuit board 57. Then, the leading end side of the housing member 56 is in contact with the rear end side of the buffer member 55. On the other hand, the rear end side of the housing member 56 faces the connection member 52 via the air gap. Moreover, the outer circumferential surface on the leading end side of the housing member 56 faces the leading end side housing 31 via the fourth insulating ring 44, the fifth insulating ring 45 and the air gap formed by these rings, and the outer circumferential surface on the rear end side of the housing member 56 faces the rear end side housing 51 via the air gap.

The circuit board 57 shows a rectangular plate shape as a whole. The circuit board 57 performs various kinds of processing using electric circuits to an electric signal caused by a weak charge outputted by the piezoelectric element 33 in response to the received pressure (a charge signal: an example of a detection signal), and is configured with a so-called printed wiring board. The circuit board 57 is provided over the inner portion of the leading end side housing 31 and the inner portion of the rear end side housing 51. Moreover, the circuit board 57 is disposed on the rear end side of the conduction member 53 and the covering member 54 and on the leading end side of the connection member 52. Further, the entirety of the circuit board 57 is disposed inside the housing member 56, and, between the outer circumferential surface on the rear end side of the circuit board 57 and the inner circumferential surface on the rear end side of the housing member 56, the holding member 58 is provided. Then, on the rear end side of the circuit board 57, a voltage receiving terminal 57c, an output signal terminal 57d and an output ground terminal 57e to be connected to the above-described first substrate side terminal 521, second substrate side terminal 522 and third substrate side terminal 523 are provided. Here, the voltage receiving terminal 57c, the output signal terminal 57d and the output ground terminal 57e are electrically connected to the first substrate side terminal 521, the second substrate side terminal 522 and the third substrate side terminal 523, respectively. Note that, though details will be described later, the voltage receiving terminal 57c is used for feeding power supply to the circuit board 57, the output signal terminal 57d is used for outputting the signals from the circuit board 57, and the output ground terminal 57e is used for grounding of the circuit board 57. The details of the circuit board 57 will be described later.

The holding member 58 shows a cylindrical shape as a whole. The holding member 58 includes a base material composed of a synthetic resin material having an insulating property, such as PPT, wiring composed of a metallic material having conductivity, such as copper, and so forth. The holding member 58 is provided over the inner portion of the leading end side housing 31 and the inner portion of the rear end side housing 51, and at a position inside the housing member 56 and outside the circuit board 57. Then, the holding member 58 is disposed on the rear end side of the fifth insulating ring 45 and on the leading end side of the connection member 52. At the center portion of the holding member 58, a through hole that penetrates through the holding member 58 is formed along the centerline direction. Moreover, the outer diameter of the holding member 58 is slightly larger than the inner diameter on the rear end side of the housing member 56. Further, the inner diameter on the leading end side of the holding member 58 is slightly smaller than the outer diameter of the circuit board 57. Then, the outer circumferential surface of the holding member 58 is in contact with the inner circumferential surface on the rear end side of the housing member 56. On the other hand, the inner circumferential surface on the leading end side of the holding member 58 is in contact with the outer circumferential surface on the rear end side of the circuit board 57. Here, the outer circumferential surface of the wiring provided to the holding member 58 is in contact with the inner circumferential surface of the housing member 56, and the inner circumferential surface of the wiring is connected to an input ground terminal 57b (which will be described in detail later) of the circuit board 57.

[Electrical Connection Structure in Pressure Detection Device]

Here, an electrical connection structure in the pressure detection device 20 will be described.

In the pressure detection device 20, an end surface on the rear end side of the piezoelectric element 33 (positive pole) is electrically connected to the rear end electrode member 36 made of metal, and the rear end electrode member 36 is connected to the conduction member 53 made of metal via the second pressure member (coil spring) 38 made of metal. Then, the conduction member 53 made of metal is electrically connected to, of the covering member 54 basically composed of an insulating body, the rear end holding part 54a made of metal, and the rear end holding part 54a is electrically connected to an input signal terminal 57a (refer to FIG. 5 to be described later) provided to the circuit board 57. Hereinafter, an electrical route from the surface on the rear end side of the piezoelectric element 33 to the input signal terminal 57a of the circuit board 57 via the rear end electrode member 36, the second pressure member 38, the conduction member 53 and the rear end holding part 54a is referred to as "positive route".

On the other hand, in the pressure detection device 20, an end surface on the leading end side of the piezoelectric element 33 (negative pole) is electrically connected to the leading end electrode member 35 made of metal, and the leading end electrode member 35 is connected to the buffer member 55 made of metal via the first pressure member 37 made of metal (and the support member 39 made of metal). Then, the buffer member 55 made of metal is electrically connected to the housing member 56 made of metal, and the housing member 56 is electrically connected to the input ground terminal 57b (refer to FIG. 5 to be described later) provided to the circuit board 57 via the wiring made of metal provided to the holding member 58 basically composed of the insulating body. Hereinafter, an electrical route from the surface on the leading end side of the piezoelectric element 33 to the input ground terminal 57b of the circuit board 57 via the leading end electrode member 35, the first pressure member 37 (the support member 39), the buffer member 55, the housing member 56 and the wiring of the holding member 58 is referred to as "negative route".

On the other hand, in the pressure detection device 20, the leading end side housing 31 (the first leading end side housing 311 and the second leading end side housing 312) made of metal is electrically connected to the diaphragm head 32 made of metal and the rear end side housing 51 made of metal. Hereinafter, an electrical route from the diaphragm head 32 to the rear end side housing 51 via the leading end side housing 31 is referred to as "housing route".

In this manner, in the pressure detection device 20 in the exemplary embodiment, the negative route exists outside the positive route. Then, the positive route and the negative route are electrically insulated by the insulating pipe 40, the first insulating ring 41, the covering member 54 and the air gap formed by these components.

Moreover, in the pressure detection device 20, the housing route exists outside the negative route. Then, the negative route and the housing route are electrically insulated by the insulating plate 34, the second insulating ring 42, the third insulating ring 43, the fourth insulating ring 44, the fifth insulating ring 45 and the air gap formed by these components.

Then, in the pressure detection device 20, since the positive route and the negative route are electrically insulated, and the negative route and the housing route are electrically insulated, the positive route and the housing route result in being electrically insulated.

Note that, in the following description, the leading end side housing 31, the diaphragm head 32 and the rear end side housing 51 are collectively referred to as "housing 60" (an example of a second housing) in some cases (refer to FIG. 2, and FIGS. 8 to 11 to be described later). Moreover, in the following description, the leading end electrode member 35, the first pressure member 37, the support member 39, the buffer member 55 and the housing member 56 are collectively referred to as "shielding body 70" in some cases (refer to FIGS. 8 to 11).

Here, in the pressure detection device 20, the housing 60 is a portion exposed to the outside, and in particular, the diaphragm head 32 is a portion facing the combustion chamber C that increases acidity with combustion. In contrast thereto, the shielding body 70 is a portion housed inside the housing 60 in the pressure detection device 20, and, in this example, also a portion forming the negative route. Therefore, it is preferable that the shielding body 70 is composed of a material having conductivity higher than that of the housing 60, and it is preferable that the housing 60 is composed of a material having resistance to acids higher than that of the shielding body 70.

[Configuration of Circuit Board]

Figure 5:
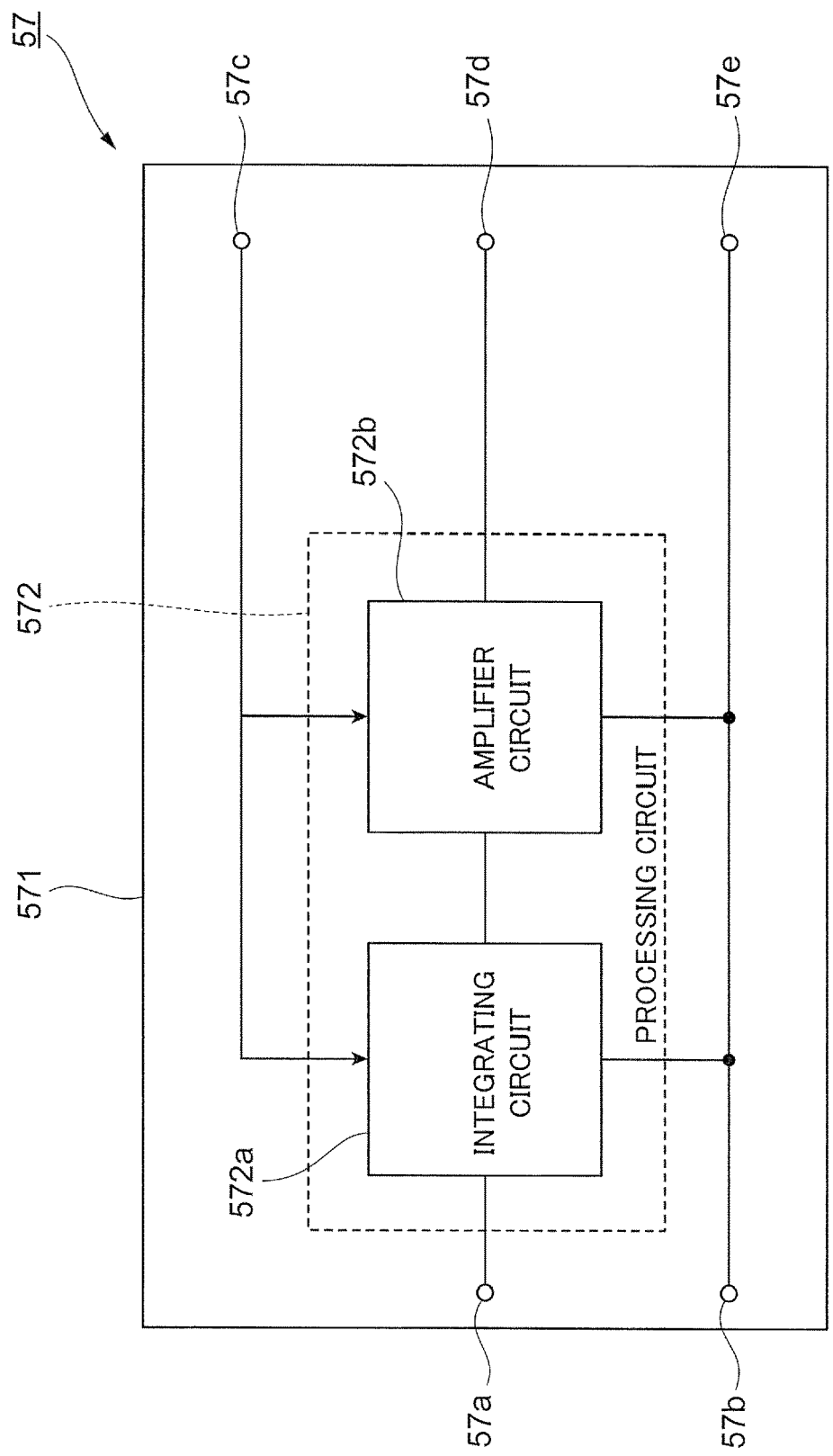
FIG. 5 is a schematic configuration view of a circuit board provided to the pressure detection device.

FIG. 5 is a schematic configuration view of the circuit board 57 provided to the pressure detection device 20.

The circuit board 57 includes: a printed wiring board 571 on which wiring (a circuit pattern) for implementing one or more electronic components (circuit elements) is formed; and a processing circuit 572 implemented on the printed wiring board 571.

In the exemplary embodiment, as the printed wiring board 571, a so-called glass-epoxy substrate, which is based on glass fabric base material epoxy resin, is used. Then, on the circuit board 57, as input/output terminals, the input signal terminal 57a, the input ground terminal 57b, the voltage receiving terminal 57c, the output signal terminal 57d and the output ground terminal 57e are provided.

Here, to the input signal terminal 57a, the positive route in the pressure detection device 20 is connected, whereas, to the input ground terminal 57b, the negative route in the pressure detection device 20 is connected. On the other hand, to the voltage receiving terminal 57*c*, the output signal terminal 57*d* and the output ground terminal 57*e*, the first substrate side terminal 521, the second substrate side terminal 522 and the third substrate side terminal 523 are connected, respectively (refer to FIG. 3). Note that, on the circuit board 57, the input ground terminal 57*b* and the output ground terminal 57*e* are connected.

Moreover, the processing circuit 572 includes: an integrating circuit 572*a* that integrates the charge signal inputted from the piezoelectric element 33 via the input signal terminal 57*a* to convert thereof into a voltage signal; and an amplifier circuit 572*b* that amplifies the converted voltage signal to output thereof to the output signal terminal 57*d*. Here, to the integrating circuit 572*a* and the amplifier circuit 572*b*, a power-supply voltage for operating thereof is supplied via the voltage receiving terminal 57*c*. Moreover, the grounds of the integrating circuit 572*a* and the amplifier circuit 572*b* are connected to the input ground terminal 57*b* and the output ground terminal 57*e*. Note that, in this example, the processing circuit 572 is configured with a so-called integrated circuit (IC).

[Pressure Detection Operation by Pressure Detection Device]

Now, pressure detection operation by the pressure detection device 20 will be described.

When the internal combustion engine 10 is operating, a pressure generated inside the combustion chamber C (combustion pressure) is imparted to the pressure receiving surface 32*a* of the diaphragm head 32. In the diaphragm head 32, the pressure received by the pressure receiving surface 32*a* is transferred to the convex part 32*c* on the back side, and is further transferred from the convex part 32*c* to the insulating plate 34. Then, the pressure transferred to the insulating plate 34 is transferred to the leading end electrode member 35; thereby the pressure acts on the piezoelectric element 33 held between the leading end electrode member 35 and the rear end electrode member 36, to thereby, in the piezoelectric element 33, generate charges corresponding to the received pressure. The charges generated in the piezoelectric element 33 are supplied to the input signal terminal 57*a* of the circuit board 57 as the charge signal via the positive route, namely, the rear end electrode member 36, the second pressure member 38, the conduction member 53 and the rear end holding part 54*a*. The charge signal supplied to the circuit board 57 is subjected to integral processing in the integrating circuit 572*a* to be converted into the voltage signal, and further subjected to amplification processing in the amplifier circuit 572*b* to be made into an output signal. Then, the output signal outputted from the amplifier circuit 572*b* is transmitted from the output signal terminal 57*d* of the circuit board 57 to the outside (here, a transmission line 92 of the connection cable 90 and the controller 80) via the second substrate side terminal 522 and the second connection terminal 52*b* provided to the connection member 52.

[Configuration of Controller]

Figure 6:
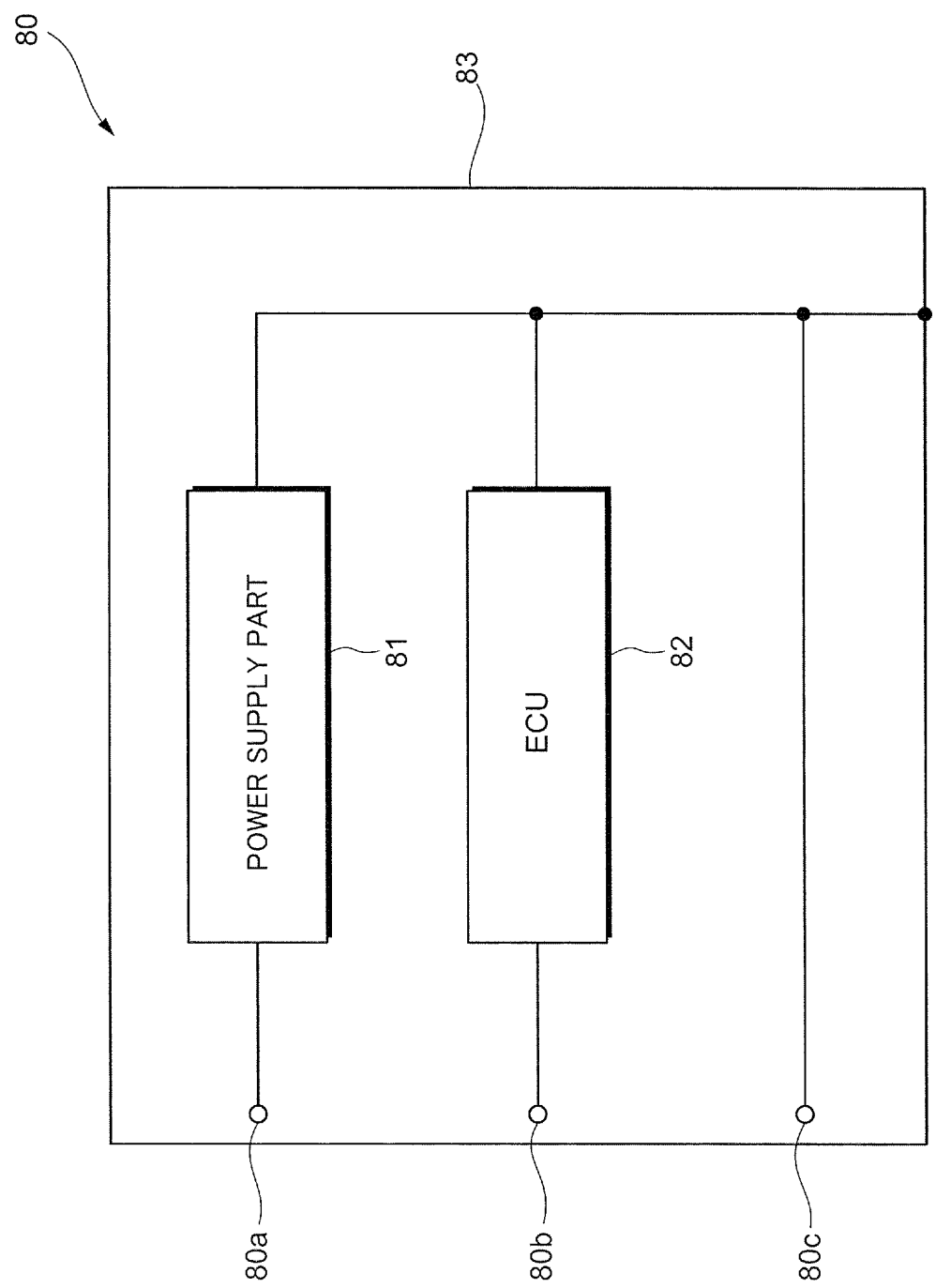
FIG. 6 is a block diagram of a controller.

FIG. 6 is a block diagram of the controller 80.

The controller 80 as an example of a supplying and processing device includes: a power supply part 81 that generates the power-supply voltage for the pressure detection device 20 by reducing a voltage (for example, +12V) supplied from a battery (not shown) to about 5V; an ECU (Engine Control Unit) 82 that controls operation of the internal combustion engine 10 based on the output signal inputted from the pressure detection device 20; and a device housing 83 that houses the power supply part 81 and the ECU 82 inside thereof. The ECU 82 is configured with a so-called one-chip microcomputer and incorporates an MPU (Micro-processing unit) that performs various kinds of arithmetic processing, a ROM (Read Only Memory) that stores programs executed by the MPU, a RAM (Random Access Memory) that stores data temporarily generated in executing the programs by the MPU, and so forth.

Moreover, the controller 80 further includes: a voltage transmission terminal 80*a* that transmits the power-supply voltage from the power supply part 81 toward the pressure detection device 20; a receiving terminal 80*b* that receives the output signal from the pressure detection device 20; and a ground terminal 80*c* for sharing a ground potential with the pressure detection device 20. Note that, in this example, the ground of each of the power supply part 81 and the ECU 82 is connected to the ground terminal 80*c*, and the ground terminal 80*c* is also connected to the device housing 83.

[Configuration of Connection Cable]

Figure 7:
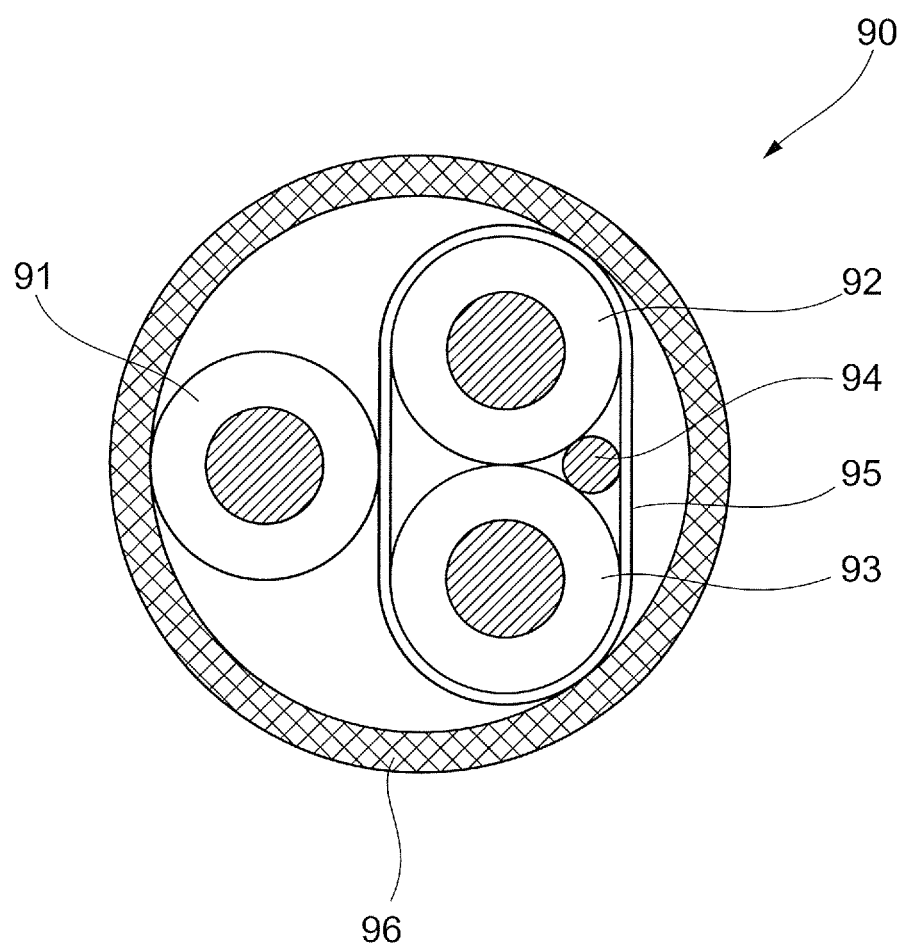
FIG. 7 is a cross-sectional view of a connection cable.

FIG. 7 is a cross-sectional view of the connection cable 90.

The connection cable 90 includes: a supply line 91; the transmission line 92; a ground line 93; a drain wire 94; a shielding part 95; and a braided part 96. Then, each of the supply line 91, the transmission line 92 and the ground line 93 includes a conductor part configured with a tinned annealed copper strand wire and an insulating part that is composed of silicon rubber or the like and covers an outer circumference of the conductor part to insulate thereof.

Moreover, the transmission line 92 and the ground line 93 are pair-stranded. Then, the drain wire 94 is configured with the tinned annealed copper strand wire or the like and vertically attached to (or twisted around) the pair-strand transmission line 92 and ground line 93. The shielding part 95 is configured by twisting an aluminum Mylar tape, in which aluminum is evaporated on one surface of PET tape, or copper foil around the transmission line 92, ground line 93 and drain wire 94. The braided part 96 is configured by braiding cotton threads, silk threads or the like, and covers the supply line 91 and the transmission line 92, the ground line 93 and the drain wire 94 unified by the shielding part 95, to thereby unify these components. Here, it may be possible to configure the braided part 96 to cover the shielding part 95 (the transmission line 92 and the ground line 93) only, and the supply line 91 may exist as a solid wire (separate body).

Then, one end of the supply line 91 is connected to the voltage receiving terminal 57*c* provided to the circuit board 57 and the other end of the supply line 91 is connected to the voltage transmission terminal 80*a* provided to the controller 80. Moreover, one end of the transmission line 92 is connected to the output signal terminal 57*d* provided to the circuit board 57 and the other end of the transmission line 92 is connected to the receiving terminal 80*b* provided to the controller 80. Further, one end of the ground line 93 is connected to the output ground terminal 57*e* provided to the circuit board 57 and the other end of the ground line 93 is connected to the ground terminal 80*c* provided to the controller 80.

[Electric Connection Structure of Pressure Detection System]

Figure 8:
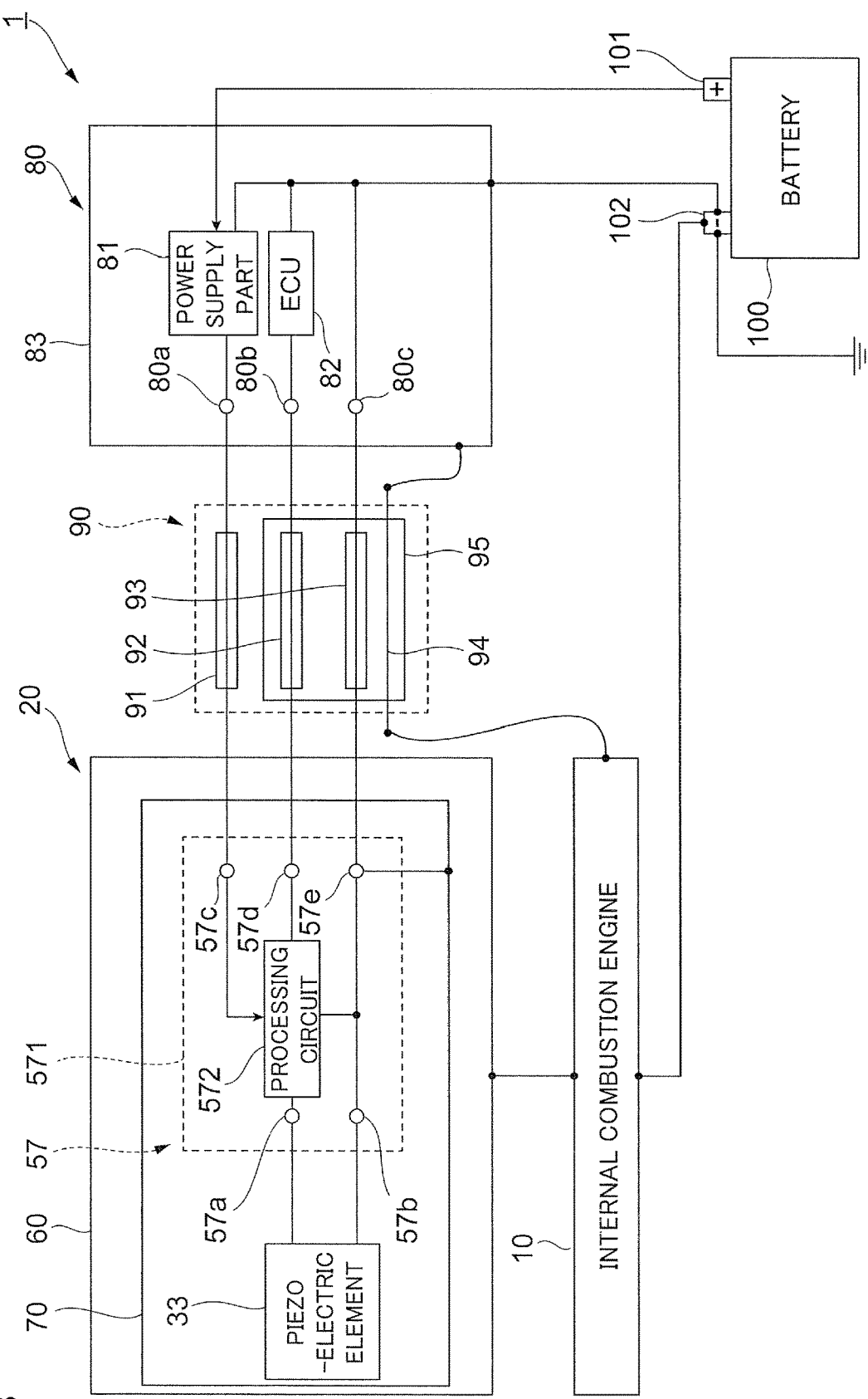
FIG. 8 is a diagram for illustrating an electrical connection structure of the pressure detection system.

FIG. 8 is a diagram for illustrating an electrical connection structure of the pressure detection system 1 of the exemplary embodiment. Note that, in FIG. 8, a battery 100 carried aboard a vehicle or the like is shown together with the internal combustion engine 10 (the same is true for FIGS. 9 to 11 to be described later).

First, a connection relationship inside the pressure detection device 20 will be described.

In the pressure detection device 20, the rear end side, namely, the positive pole side of the piezoelectric element 33 is connected to the input signal terminal 57a of the circuit board 57 via the positive route, and the leading end side, namely, the negative pole side of the piezoelectric element 33 is connected to the input ground terminal 57b of the circuit board 57 via the negative route. Moreover, on the circuit board 57, each of the input signal terminal 57a, the input ground terminal 57b, the voltage receiving terminal 57c, the output signal terminal 57d and the output ground terminal 57e is connected to the processing circuit 572.

Further, in the pressure detection device 20, the output ground terminal 57e provided to the circuit board 57 (the input ground terminal 57b may also be used) is connected to the shielding body 70 including the housing member 56 that houses the circuit board 57 inside thereof. Then, in the pressure detection device 20, the shielding body 70 and the housing 60 that houses the shielding body 70 inside thereof are insulated.

Next, a connection relationship inside the controller 80 will be described.

In the controller 80, the output side of the power supply part 81 is connected to the voltage transmission terminal 80a, and the input side of the ECU 82 is connected to the receiving terminal 80b. Moreover, in the controller 80, a grant side of the power supply part 81 and the ECU 82 are connected to the ground terminal 80c and the device housing 83.

Subsequently, a connection relationship between the pressure detection device 20 and the internal combustion engine 10 will be described.

In the exemplary embodiment, as described by use of FIG. 1, the pressure detection device 20 is attached to the internal combustion engine 10 by screwing the pressure detection device 20 into the cylinder head 13 (more specifically, the communication hole 13a) provided to the internal combustion engine 10. Therefore, the housing 60 (the first leading end side housing 311) constituting the pressure detection device 20 is connected to the internal combustion engine 10 (the cylinder head 13).

Further, a connection relationship between the internal combustion engine 10 and the controller 80 and the battery 100 will be described.

A positive electrode 101 of the battery 100 is connected to the power supply part 81 provided to the controller 80. On the other hand, a negative electrode 102 (an example of a conductor) of the battery 100 is connected to the internal combustion engine 10 and the device housing 83 of the controller 80. Moreover, the negative electrode 102 of the battery 100 is connected (grounded) to a body of a vehicle.

Still further, a connection relationship between the pressure detection device 20, the internal combustion engine 10, the connection cable 90 and the controller 80 will be described.

First, regarding the supply line 91 constituting the connection cable 90, one end thereof is connected to the voltage receiving terminal 57c provided to the circuit board 57 of the pressure detection device 20 and the other end thereof is connected to the voltage transmission terminal 80a provided to the controller 80. Moreover, regarding the transmission line 92 constituting the connection cable 90, one end thereof is connected to the output signal terminal 57d provided to the circuit board 57 of the pressure detection device 20 and the other end thereof is connected to the receiving terminal 80b provided to the controller 80. Further, regarding the ground line 93 constituting the connection cable 90, one end thereof is connected to the output ground terminal 57e provided to the circuit board 57 of the pressure detection device 20 and the other end thereof is connected to the ground terminal 80c provided to the controller 80. Still further, regarding the drain wire 94 constituting the connection cable 90 and being in contact with the shielding part 95, one end thereof is connected to the internal combustion engine 10, and the other end thereof is connected to the device housing 83 of the controller 80. In this manner, both ends of the drain wire 94 provided to the connection cable 90 are grounded.

Note that, though the description was omitted here, in actuality, the connection cable 90 is connected to the circuit board 57 via the connection member 52 provided to the pressure detection device 20 (refer to FIG. 3).

Therefore, in actuality, one end of the supply line 91 is connected to the first connection terminal 52a of the connection member 52 and, via the first substrate side terminal 521 of the connection member 52, connected to the voltage receiving terminal 57c of the circuit board 57. Moreover, in actuality, one end of the transmission line 92 is connected to the second connection terminal 52b of the connection member 52 and, via the second substrate side terminal 522 of the connection member 52, connected to the output signal terminal 57d of the circuit board 57. Further, in actuality, one end of the ground line 93 is connected to the third connection terminal 52c of the connection member 52 and, via the third substrate side terminal 523 of the connection member 52, connected to the output ground terminal 57e of the circuit board 57.

In the pressure detection device 20 of the pressure detection system 1 in the exemplary embodiment, the housing 60 that houses the piezoelectric element 33, the circuit board 57, the shielding body 70 and so forth inside thereof is connected (grounded) to the negative electrode 102 of the battery 100 via the internal combustion engine 10. In contrast thereto, inside the housing 60, the shielding body 70 that electrically shields the piezoelectric element 33 and the circuit board 57 from the outside by housing these components inside thereof and functions as a grounded system for these piezoelectric element 33 and circuit board 57 is connected (grounded) to the negative electrode 102 of the battery 100 via the connection cable 90 (the ground line 93) and the controller 80. Then, in the pressure detection device 20, the housing 60 and the shielding body 70 are insulated.

The pressure detection device 20 of the exemplary embodiment is attached to the internal combustion engine 10, and, when the internal combustion engine 10 is carried aboard a vehicle, noise of frequency of the order of kHz (hereinafter, referred to as low-frequency noise) generated in a horn, headlights, wipers comes into the cylinder head 13 of the internal combustion engine 10. Then, in the exemplary embodiment, since, of the pressure detection device 20, the housing 60 composed of metal is attached to the cylinder head 13 composed of metal, the low-frequency noise coming into the cylinder head 13 also propagates to the housing 60 of the pressure detection device 20.

Here, in the pressure detection device 20 of the exemplary embodiment, the housing 60 is electrically insulated from the positive route and the negative route from the piezoelectric element 33 to the circuit board 57. Therefore, the low-frequency noise propagated from the cylinder head 13 to the housing 60 of the pressure detection device 20 becomes unlikely to be transferred to the circuit board 57. As a result, fluctuations (variations) in the ground potential in the circuit board 57 due to the low-frequency noise is suppressed, and therefore, it becomes possible to reduce fluctuations (variations) in the output signal outputted from the circuit board 57.

Moreover, when the internal combustion engine 10 of the exemplary embodiment is carried aboard a vehicle, radio waves of the order of MHz used by mobile phones, radio, television and so forth usually fly around the vehicle. When the radio waves are emitted to the circuit board 57 provided to the pressure detection device 20, noise of frequency of the order of MHz (hereinafter, referred to as high-frequency noise) is generated in the circuit board 57.

Here, in the exemplary embodiment, the circuit board 57 is covered with (housed in) the housing member 56 made of metal and constituting the shielding body 70. Therefore, the radio waves emitted to the pressure detection device 20 from the outside are shielded by the shielding body 70 including the housing member 56, to be less likely to reach the circuit board 57. As a result, fluctuations (variations) in the ground potential in the circuit board 57 due to the high-frequency noise is suppressed, and therefore, it becomes possible to reduce fluctuations (variations) in the output signal outputted from the circuit board 57.

Then, in the exemplary embodiment, since the shielding body 70 also serves as the negative route, the configuration of the pressure detection device 20 is easily formed as compared to a case in which the shielding body 70 and the negative route are separately provided.

[First Modified Example of Electrical Connection Structure of Pressure Detection System]

Figure 9:
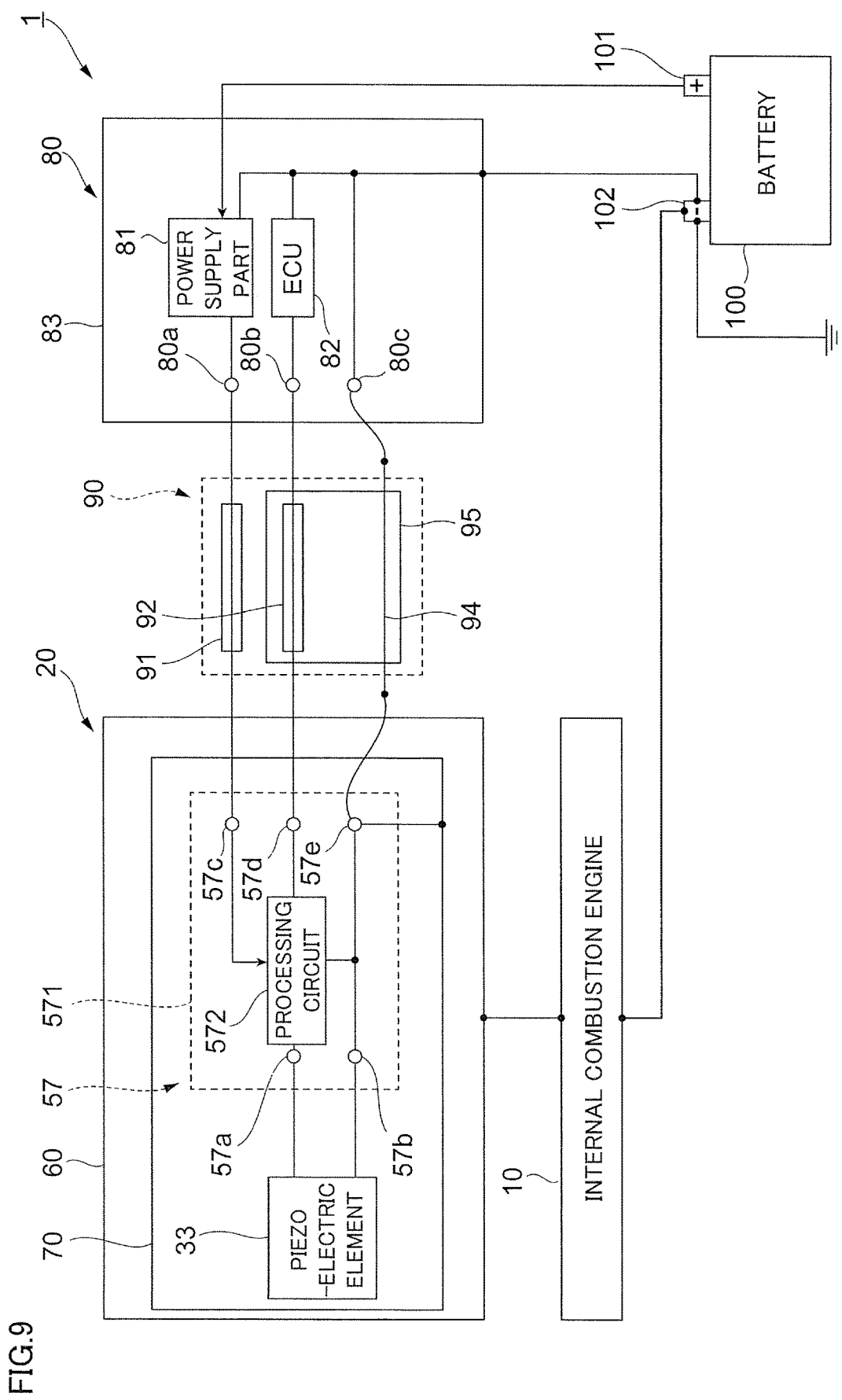
FIG. 9 is a diagram for illustrating a first modified example of the electrical connection structure of the pressure detection system.

FIG. 9 is a diagram for illustrating a first modified example of the electrical connection structure of the pressure detection system 1.

In the example shown in FIG. 9, the connection relationship inside the pressure detection device 20, the connection relationship inside the controller 80, the connection relationship between the pressure detection device 20 and the internal combustion engine 10, and the connection relationship between the internal combustion engine 10 and the controller 80 and the battery 100 are same as those described in FIG. 8.

However, in the example shown in FIG. 9, the points that the connection cable 90 does not include the ground line 93, one end of the drain wire 94 provided to the connection cable 90 is not connected to the internal combustion engine 10, but is connected to the output ground terminal 57e of the circuit board 57 in the pressure detection device 20, and the other end of the drain wire 94 is not connected to the device housing 83 of the controller 80, but is connected to the ground terminal 80c of the controller 80 are different from the example shown in FIG. 8.

Then, also in the pressure detection system 1 shown in FIG. 9, similar to the system shown in FIG. 8, it becomes possible to reduce fluctuations (variations) in the output signal due to the low-frequency noise and the high-frequency noise coming into the circuit board 57 from the outside. In particular, in the example shown in FIG. 9, the potential of the shielding part 95 connected to (brought into contact with) the drain wire 94 in the connection cable 90 can be made in common with the potential of the shielding body 70 provided to the pressure detection device 20 (the ground potential of the pressure detection device 20). Therefore, as shown in FIG. 8, by connecting one end of the drain wire 94 to the internal combustion engine 10, the low-frequency noise is less likely to be superimposed on the output signal in the transmission line 92 as compared to a case in which the potential of the shielding part 95 is made in common with the potential of the internal combustion engine 10 where the low-frequency noise possibly exists.

Moreover, in the pressure detection system 1 shown in FIG. 9, as compared to the configuration shown in FIG. 8, there is also an advantage of being capable of reducing the number of core wires constituting the connection cable 90 (three wires to two wires).

[Second Modified Example of Electrical Connection Structure of Pressure Detection System]

Figure 10:
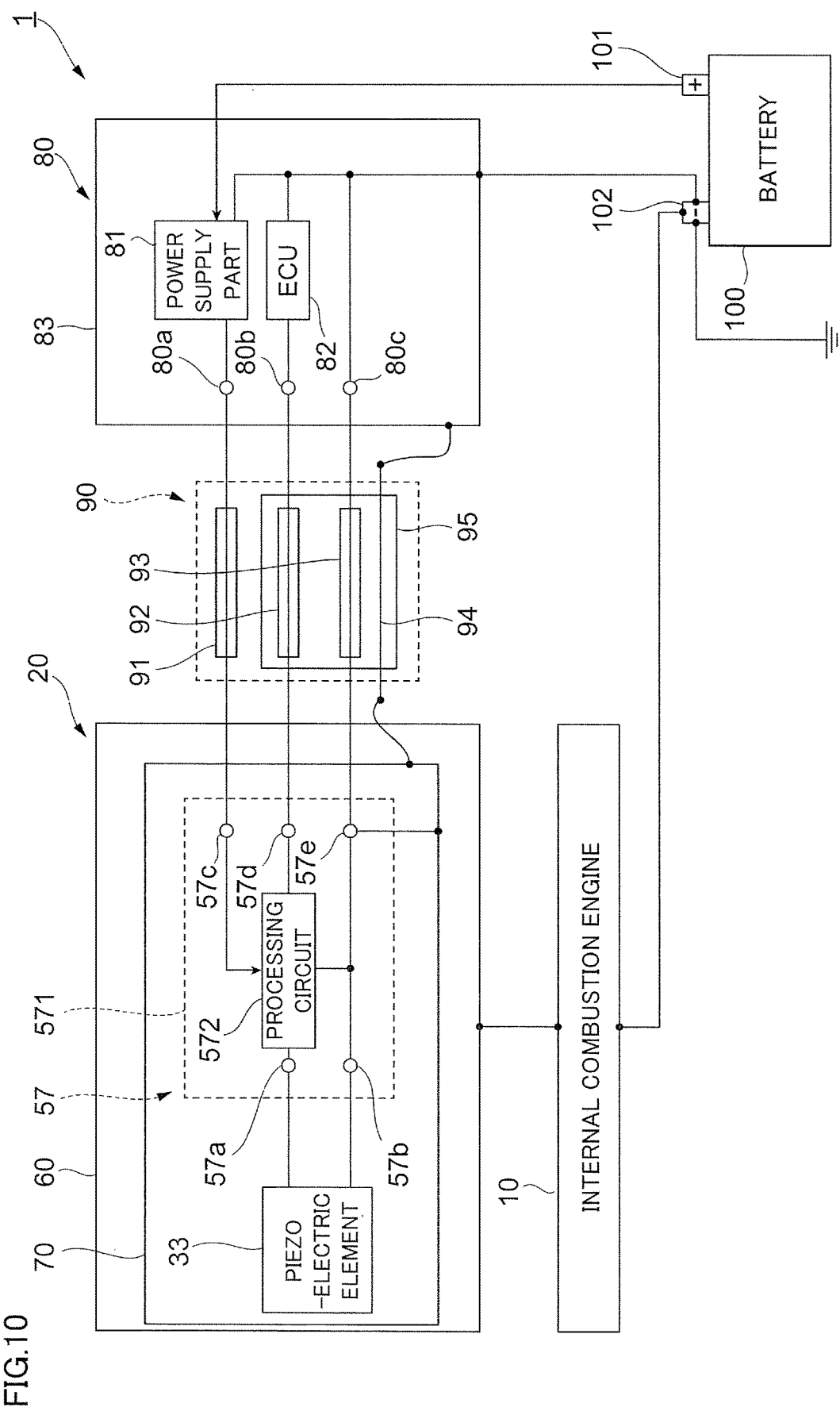
FIG. 10 is a diagram for illustrating a second modified example of the electrical connection structure of the pressure detection system.

FIG. 10 is a diagram for illustrating a second modified example of the electrical connection structure of the pressure detection system 1.

In the example shown in FIG. 10, the connection relationship inside the pressure detection device 20, the connection relationship inside the controller 80, the connection relationship between the pressure detection device 20 and the internal combustion engine 10, and the connection relationship between the internal combustion engine 10 and the controller 80 and the battery 100 are same as those described in FIG. 8.

However, in the example shown in FIG. 10, the point that one end of the drain wire 94 provided to the connection cable 90 is not connected to the internal combustion engine 10, but is connected to the shielding body 70 in the pressure detection device 20 is different from the example shown in FIG. 8.

Then, also in the pressure detection system 1 shown in FIG. 10, similar to the system shown in FIG. 8, it becomes possible to reduce fluctuations (variations) in the output signal due to the low-frequency noise and the high-frequency noise coming into the circuit board 57 from the outside. In particular, in the example shown in FIG. 10, the potential of the shielding part 95 connected to (brought into contact with) the drain wire 94 in the connection cable 90 can be made in common with the potential of the shielding body 70 provided to the pressure detection device 20 (the ground potential of the pressure detection device 20). Therefore, as shown in FIG. 8, by connecting one end of the drain wire 94 to the internal combustion engine 10, the low-frequency noise is less likely to be superimposed on the output signal in the transmission line 92 as compared to a case in which the potential of the shielding part 95 is made in common with the potential of the internal combustion engine 10 where the low-frequency noise possibly exists.

Moreover, in the pressure detection system 1 shown in FIG. 10, as compared to the configuration shown in FIG. 8, there are two grounded systems that connect the pressure detection device 20 and the controller 80 (the ground line 93 and the drain wire 94). Therefore, even when disconnection or the like occurs in one of the ground line 93 and the drain wire 94, it becomes possible to keep the ground common to the pressure detection device 20 and the controller 80 by the other remaining line, and thereby system redundancy can be increased.

[Third Modified Example of Electrical Connection Structure of Pressure Detection System]

Figure 11:
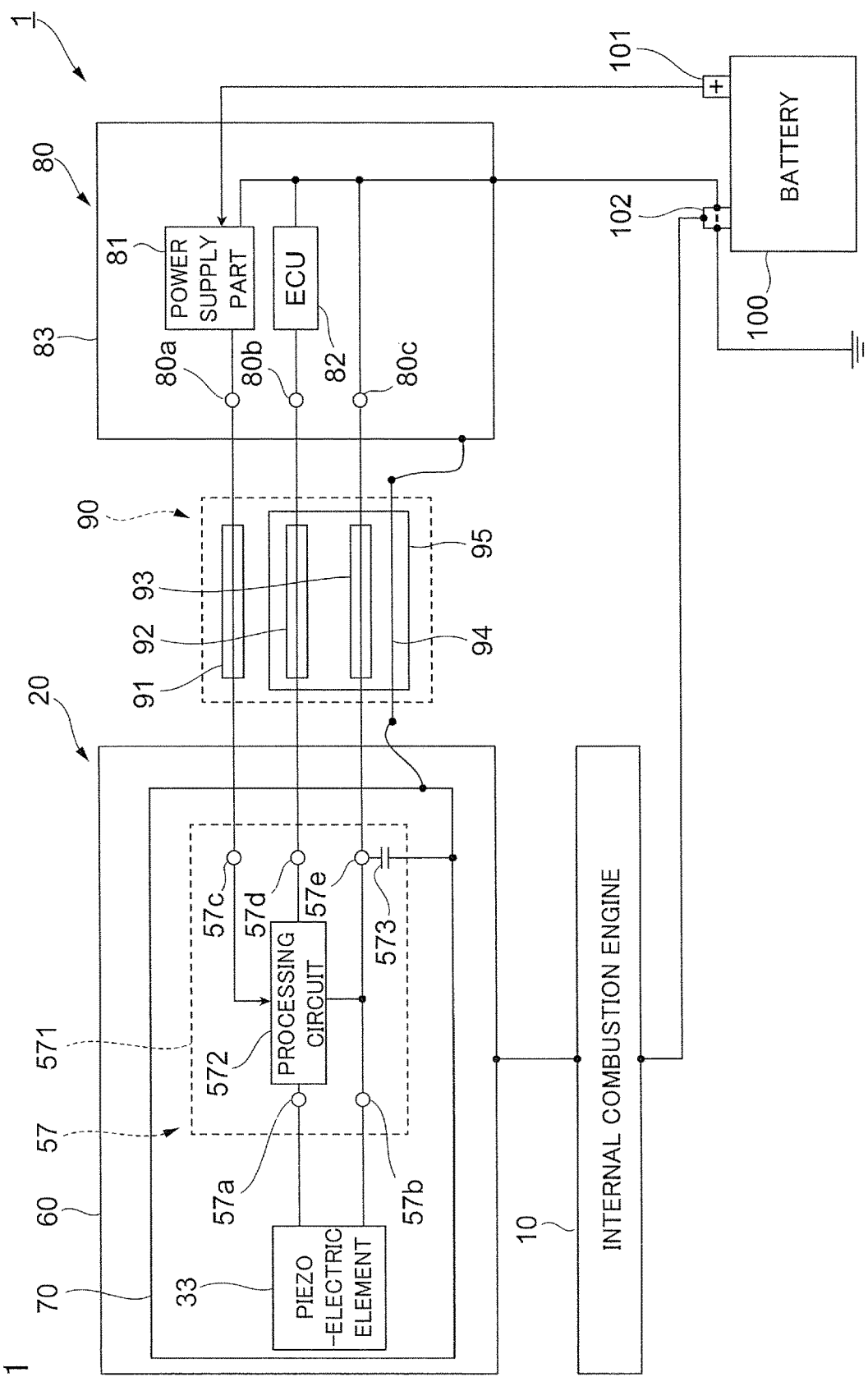
FIG. 11 is a diagram for illustrating a third modified example of the electrical connection structure of the pressure detection system.

FIG. 11 is a diagram for illustrating a third modified example of the electrical connection structure of the pressure detection system 1.

In the example shown in FIG. 11, the connection relationships inside each device and between devices are basically the same as those described in FIG. 10.

However, in the example shown in FIG. 11, the point that the pressure detection device 20 further includes a capacitor 573 (an example of a DC suppressing part) connected to the output ground terminal 57e and the shielding body 70 is different from the example shown in FIG. 10. Note that, in this example, the capacitor 573 is attached to the circuit board 57; however, the capacitor 573 may be attached to a portion different from the circuit board 57.

Then, also in the pressure detection system 1 shown in FIG. 11, similar to the system shown in FIG. 8, it becomes possible to reduce fluctuations (variations) in the output signal due to the low-frequency noise and the high-frequency noise coming into the circuit board 57 from the outside. Moreover, in the pressure detection system 1 shown in FIG. 11, as same as the system shown in FIG. 10, the potential of the shielding part 95 connected to (brought into contact with) the drain wire 94 in the connection cable 90 can be made in common with the potential of the shielding body 70 provided to the pressure detection device 20 (the ground potential of the pressure detection device 20). Therefore, as shown in FIG. 8, by connecting one end of the drain wire 94 to the internal combustion engine 10, the low-frequency noise is less likely to be superimposed on the output signal in the transmission line 92 as compared to a case in which the potential of the shielding part 95 is made in common with the potential of the internal combustion engine 10 where the low-frequency noise possibly exists.

Moreover, as described above, in the pressure detection system 1 shown in FIG. 10, since there are two grounded systems that connect the pressure detection device 20 and the controller 80 (the ground line 93 and the drain wire 94), even in the state in which one of them is disconnected, it is possible to keep the ground in common by using the other line. However, for example, even in the case in which disconnection occurs in the ground line 93, since the current flows through the supply line 91 and the drain wire 94, it becomes impossible to detect disconnection in the ground line 93. In contrast thereto, in the example shown in FIG. 11, in the pressure detection device 20, the shielding body 70 and the output ground terminal 57e, to which one end of the ground line 93 is connected, are connected via the capacitor 573. This allows, under the condition that disconnection does not occur in the ground line 93, when DC voltage is applied between the voltage transmission terminal 80a and the ground terminal 80c in the controller 80, DC current to flow in the supply line 91 and the ground line 93. In contrast thereto, under the condition that disconnection occurs in the ground line 93, when the DC voltage is applied between the voltage transmission terminal 80a and the ground terminal 80c in the controller 80, the DC current does not flow in the disconnected ground line 93, and in addition, due to existence of the capacitor 573, the DC current does not flow to the drain wire 94 that is not disconnected. Therefore, when the capacitor 573 is provided to the pressure detection device 20, based on whether or not the DC current is passed, it becomes possible to detect disconnection in the ground line 93.

Further, in the example shown in FIG. 11, as same as the system shown in FIG. 10, there are two grounded systems that connect the pressure detection device 20 and the controller 80 (the ground line 93 and the drain wire 94). Therefore, even when disconnection or the like occurs in the ground line 93 and the drain wire 94, it becomes possible to keep the common ground by any other remaining line, and thereby system redundancy can be increased.

Here, in the example shown in FIG. 11, the capacitor 573 is used as the DC suppressing part; however, the DC suppressing part is not limited thereto and, for example, a diode in which a side close to the output ground terminal 57e serves as a cathode may be used.

[Others]

Note that, in the exemplary embodiment, the housing 60 of the pressure detection device 20 is composed of a metallic material having conductivity; however, the material is not limited thereto, and the housing 60 may be composed of a material having the insulating property, such as alumina ceramics or zirconia ceramics. In this case, it becomes unnecessary to insulate the housing 60 and the shielding body 70 via the various kinds of insulating members (the insulating plate 34, the fourth insulating ring 44 and the fifth insulating ring 45) and the air gap.

Moreover, in the exemplary embodiment, the piezoelectric element 33, the positive route and the circuit board 57 are covered with (housed in) the shielding body 70; however, at least part of the circuit board 57 is covered (housed), an effect of reducing the noise is generated as compared to a case in which the circuit board 57 is not at all covered (housed).

Here, in the exemplary embodiment, the circuit board 57 is covered (housed) by use of the housing member 56 showing the cylindrical shape; however, the housing member 56 is not limited thereto and, for example, a metal braid, in which a metal is braided, or the like may be used.

Further, in the exemplary embodiment, both ends of the drain wire 94 provided to the connection cable 90 are grounded; however, grounding is not limited thereto, and one end grounding may be possible. However, when both ends of the drain wire 94 are grounded, as compared to the case in which one end of the drain wire 94 is grounded, incoming of noise into the circuit board 57 is suppressed with ease.

Exemplary Embodiment 2

[Configuration of Pressure Detection Device]

Figure 12:
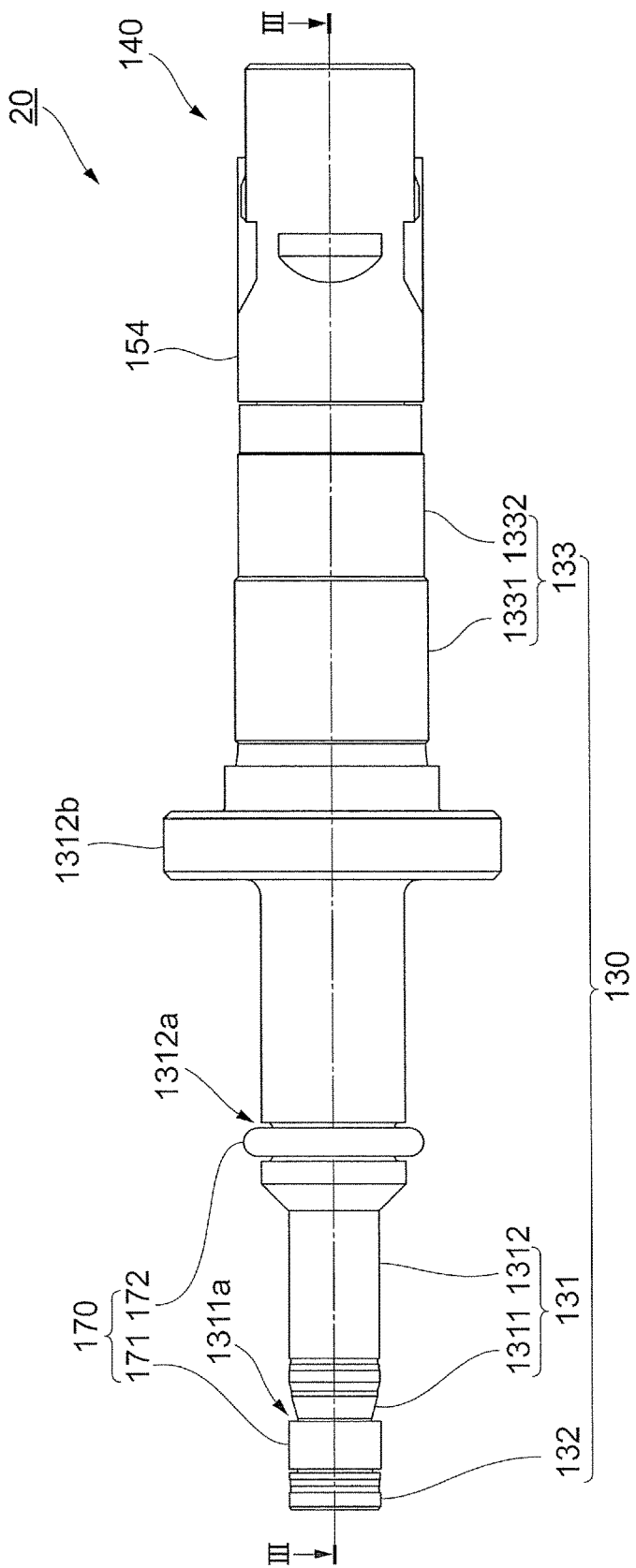
FIG. 12 is a side view of a pressure detection device in Exemplary embodiment 2.
Figure 13:
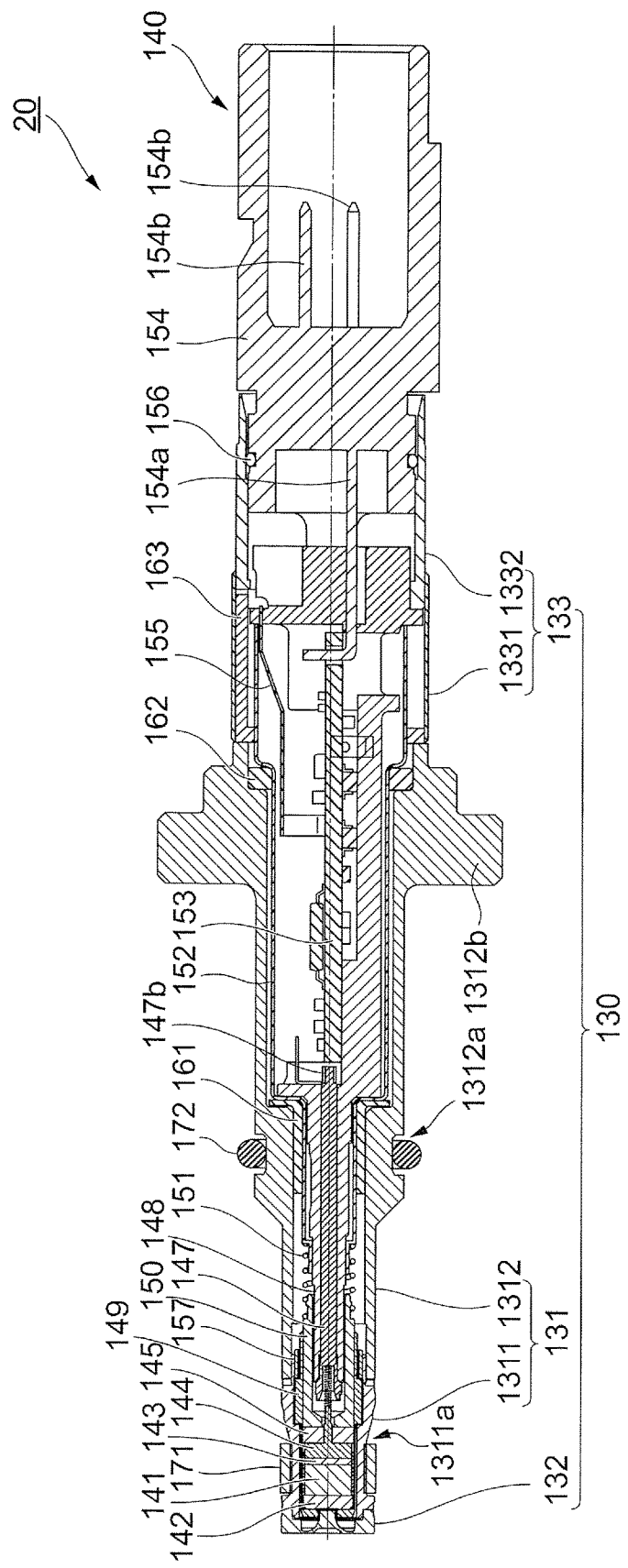
FIG. 13 is a cross-sectional view (a XIII-XIII cross-sectional view in FIG. 12) of the pressure detection device.
Figure 14:
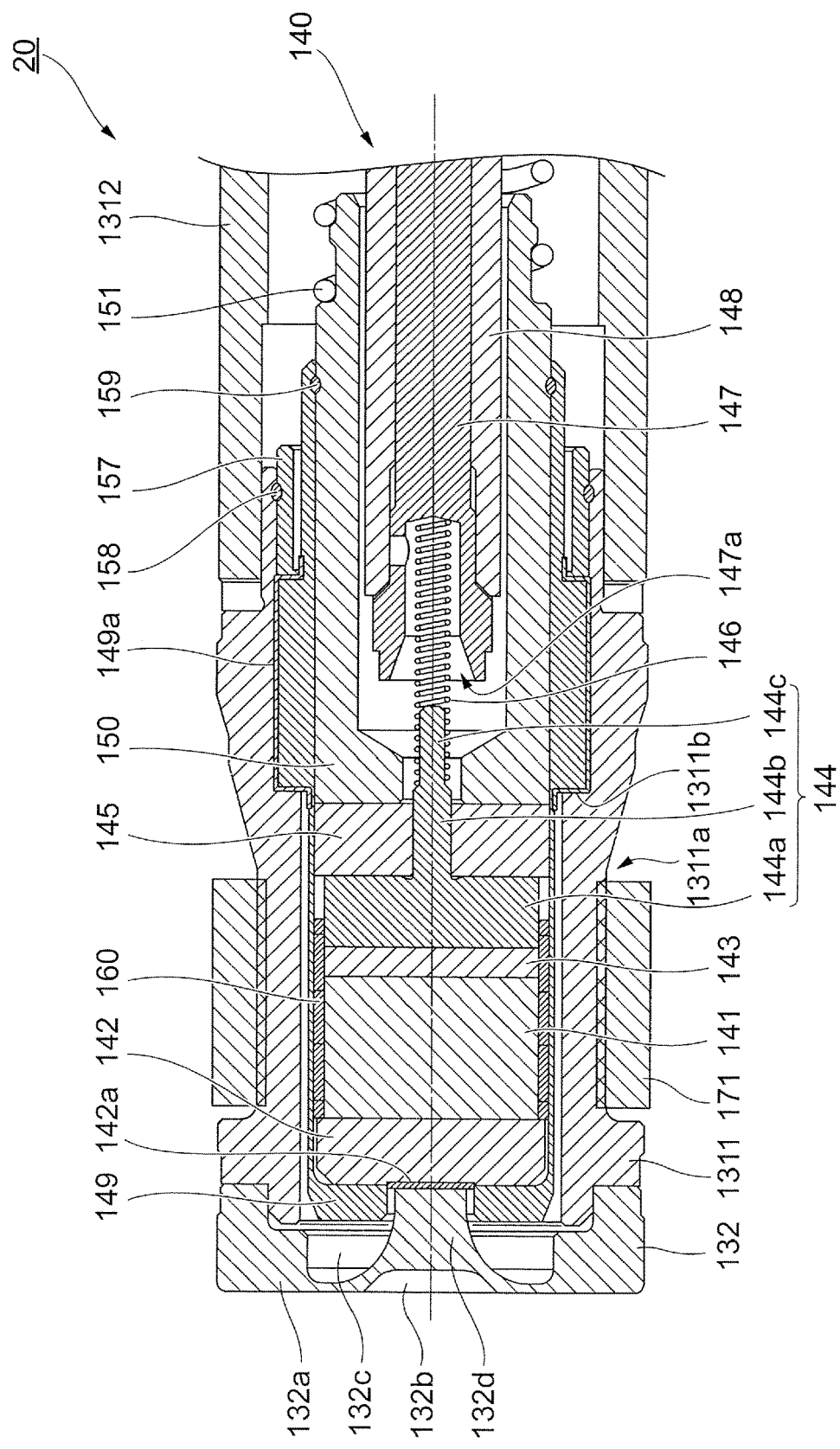
FIG. 14 is an enlarged cross-sectional view of a leading end side of the pressure detection device.

FIG. 12 is a side view of the pressure detection device 20 in Exemplary embodiment 2. FIG. 13 is a cross-sectional view (a XIII-XIII cross-sectional view in FIG. 12) of the pressure detection device 20. FIG. 14 is an enlarged cross-sectional view of a leading end side of the pressure detection device 20.

The pressure detection device 20 in the exemplary embodiment includes: a housing part 130 exposed to the outside; a detection mechanism part 140 which includes various kinds of mechanisms for detecting pressure and provided so that almost entirety of which is housed in the housing part 130 and part (a connection member 154 to be described later) of which is exposed to the outside; and a sealing part 170 attached to an outer circumferential surface of the housing part 130. Then, the pressure detection device 20 is attached to the internal combustion engine 10 shown in FIG. 1 so that the left side in FIG. 12 (the portion where the housing part 130 is exposed) faces toward the combustion chamber C (the lower side in FIG. 1) and right side in FIG. 12 (the portion where the detection mechanism part 140 is exposed) faces toward the outside (upward in FIG. 1). Moreover, in this state, the sealing part 170 is positioned inside the communication hole 13a provided to the cylinder head 13. Note that, in the following description, in FIG. 12, a side heading for left in the figure is referred to as "leading end side" of the pressure detection device 20 and a side heading for right in the figure is referred to as "rear end side" of the pressure detection device 20. Moreover, in the following description, a centerline direction of the pressure detection device 20 indicated by a dot-and-dash line in FIG. 12 is simply referred to as a centerline direction.

[Configuration of Housing Part]

The housing part 130 includes: a leading end side housing 131; a diaphragm head 132 attached to a leading end side of the leading end side housing 131; and a rear end side housing 133 attached to a rear end side of the leading end side housing 131. Here, in the exemplary embodiment, the leading end side housing 131 and the rear end side housing 133 function as an example of the second housing, and the diaphragm head 132 functions as an example of the deformation member.

(Leading End Side Housing)

The leading end side housing 131 is a member having a hollow structure and showing a cylindrical shape as a whole. The leading end side housing 131 is composed of a metallic material having conductivity and high resistance to heat and acids, such as stainless steel.

The leading end side housing 131 includes a first leading end side housing 1311 that is positioned relatively close to the leading end side thereof and a second leading end side housing 1312 that is positioned relatively close to the rear end side thereof. Here, by applying laser welding to an outer circumferential surface on the rear end side of the first leading end side housing 1311 and an inner circumferential surface on the leading end side of the second leading end side housing 1312, the leading end side housing 131 has a configuration integrating both. Then, to the leading end side of the first leading end side housing 1311, the diaphragm head 132 is attached by laser welding, and, to the rear end side of the second leading end side housing 1312, the rear end side housing 133 is attached by fitting.

Here, the outer circumferential surface of the first leading end side housing 1311 is provided with a concave part 1311a for putting a first sealing member 171 (which will be described in detail later) constituting the sealing part 170. Moreover, inside the first leading end side housing 1311, there are a portion on the leading end side set as a first diameter and a portion on the rear end side set as a second diameter, which is larger than the first diameter, and at a boundary of these two portions, an inside stepped part 1311b that connects both portions is provided.

On the other hand, the outer circumferential surface of the second leading end side housing 1312 is provided with a concave part 1312a for putting a second sealing member 172 (which will be described in detail later) constituting the sealing part 170 together with the first sealing member 171. Moreover, of the outer circumferential surface of the second leading end side housing 1312, on the rear end side than the above-described concave part 1312a, a ring-shaped rib part 1312b projecting outward is provided. The rib part 1312b is, as described above, used for fixing the pressure detection device 20 to the internal combustion engine 10 (more specifically, the cylinder head 13).

(Diaphragm Head)

The diaphragm head 132 shows a disk shape as a whole. The diaphragm head 132 is composed of a metallic material having conductivity and high resistance to heat and acids, such as stainless steel. Particularly, in this example, the diaphragm head 132 and the above-described leading end side housing 131 are composed of the same material.

The diaphragm head 132 includes: a pressure receiving surface (front surface) 132a that has a concave part 132b formed at the center portion on the leading end side thereof and is exposed to the outside (combustion chamber C side) to receive a pressure; a concave part 132c that is provided by cutting a rear surface, which is the back side of the pressure receiving surface 132a in a ring shape; and a convex part 132d that projects, as a result of presence of the concave part 132c, from the center portion of the pressure receiving surface 132a (the portion where the concave part 132b is formed) toward the rear end side. The diaphragm head 132 is provided to close an opening part of the leading end side in the first leading end side housing 1311. Then, at a boundary portion between the diaphragm head 132 and the first leading end side housing 1311, laser welding is applied around the outer circumferential surface.

(Rear End Side Housing)

The rear end side housing 133 is a member having a hollow structure and showing a cylindrical shape as a whole. The rear end side housing 133 is composed of a metallic material having conductivity and high resistance to heat and acids, such as stainless steel. However, since the rear end side housing 133 is positioned outside the internal combustion engine 10 in the state where the pressure detection device 20 is mounted to the internal combustion engine 10, materials having resistance to heat and resistance to acids lower than those of the above-described leading end side housing 131 can be used.

The rear end side housing 133 includes a first rear end side housing 1331 that is positioned relatively close to the leading end side thereof and a second rear end side housing 1332 that is positioned relatively close to the rear end side thereof. Here, by fitting an outer circumferential surface on the leading end side of the second rear end side housing 1332 into an inner circumferential surface on the rear end side of the first rear end side housing 1331, the rear end side housing 133 has a configuration integrating both. Then, to the leading end side of the first rear end side housing 1331, the leading end side housing 131 (more specifically, the second leading end side housing 1312) is attached by fitting, and, to the rear end side of the second rear end side housing 1332, a connection member 154 (which will be described in detail later) is attached by setting in.

[Configuration of Detection Mechanism Part]

The detection mechanism part 140 includes: a piezoelectric element 141; a leading end electrode member 142; a first rear end electrode member 143 and a second rear end electrode member 144. Moreover, the detection mechanism part 140 includes: an insulating ring 145; a first coil spring 146; a conduction member 147; and a holding member 148. Further, the detection mechanism part 140 includes: a pressure member 149; a support member 150; a second coil spring 151; and a housing member 152. Still further, the detection mechanism part 140 includes: a circuit board 153; the connection member 154; a ground plate 155; and an O-ring 156. Moreover, the detection mechanism part 140 includes a butting pipe 157. Then, the detection mechanism part 140 includes: an insulating pipe 160; a first insulating member 161; a second insulating member 162; and a third insulating member 163.

(Piezoelectric Element)

The piezoelectric element 141 as an example of the detection element shows a columnar shape as a whole. The piezoelectric element 141 is provided with a piezoelectric body showing a piezoelectric action of piezoelectric longitudinal effect. The piezoelectric longitudinal effect refers to generation of charge on a surface of the piezoelectric body in the direction of a charge generating axis when an external force is applied to a stress application axis in the same direction as the charge generating axis of the piezoelectric body. The piezoelectric element 141 is disposed inside the leading end side housing 131 and on the rear end side of the diaphragm head 132. The piezoelectric element 141 is housed in the leading end side housing 131 so that the centerline direction thereof is in the same direction as the stress application axis. Here, the piezoelectric element 141 is disposed inside the insulating pipe 160 provided inside the pressure member 149 which is provided inside the leading end side housing 131. Moreover, the outer diameter of the piezoelectric element 141 is slightly smaller than the inner diameter of the insulating pipe 160 that houses the piezoelectric element 141 inside thereof. Then, the surface on the leading end side of the piezoelectric element 141 is in contact with the surface on the rear end side of the leading end electrode member 142. On the other hand, the surface on the rear end side of the piezoelectric element 141 is in contact with the surface on the leading end side of the rear end electrode member 143. Moreover, the outer circumferential surface of the piezoelectric element 141 faces the inner circumferential surface of the insulating pipe 160. In this manner, by providing the insulating pipe 160 between the inner circumferential surface of the pressure member 149 and the outer circumferential surface of the piezoelectric element 141, the pressure member 149 and the piezoelectric element 141 are not directly in contact with each other.

Next, a case in which piezoelectric transversal effect is used for the piezoelectric element 141 will be exemplified. The piezoelectric transversal effect refers to generation of charge on a surface of the piezoelectric body in the direction of a charge generating axis when an external force is applied to a stress application axis in a position orthogonal to the charge generating axis of the piezoelectric body. Plural piezoelectric bodies formed into thin plate shape may be laminated for configuration, and, by laminating in this manner, it is possible to efficiently collect charges generated in the piezoelectric body, to thereby increase sensitivity of a sensor. As the piezoelectric body that can be used for the piezoelectric element 141, use of langasite crystal (langasite, langatate, langanite, LTGA), quartz or gallium phosphate having the piezoelectric longitudinal effect and the piezoelectric transversal effect can be shown as examples. Note that, in the piezoelectric element 141 of the exemplary embodiment, LTGA single crystal is used as the piezoelectric body.

(Leading End Electrode Member)

The leading end electrode member 142 shows a columnar shape as a whole. The leading end electrode member 142 is composed of a metallic material having conductivity and high resistance to heat, such as stainless steel. Moreover, at the center portion of the surface on the leading end side of the leading end electrode member 142, an insulating film 142a formed by coating a ceramic material, which includes alumina, zirconia or the like, showing the insulating property is provided. Here, the insulating film 142a as an example of the insulating transmission member shows, for example, a circular shape; the diameter thereof is larger than the diameter of the convex part 132d provided to the rear surface of the diaphragm head 132 and smaller than the diameter of the opening part provided to the leading end side of the pressure member 149.

The leading end electrode member 142 is disposed inside the pressure member 149 provided inside the leading end side housing 131. Then, the leading end electrode member 142 is disposed on the rear end side of the diaphragm head 132 and on the leading end side of the piezoelectric element 141. However, different from the above-described piezoelectric element 141, the leading end electrode member 142 is not housed inside the insulating pipe 160. Moreover, the outer diameter of the leading end electrode member 142 is slightly smaller than the inner diameter of the pressure member 149 that houses the leading end electrode member 142 inside thereof. Then, of the surface on the leading end side of the leading end electrode member 142, the region at the center portion where the insulating film 142a is provided is in contact with the surface on the rear end side of the convex part 132d provided to the rear surface of the diaphragm head 132. Moreover, of the surface on the leading end side of the leading end electrode member 142, the region at a periphery portion where the insulating film 142a is not provided is in contact with the surface on the back side of the opening part provided to the leading end side of the pressure member 149. On the other hand, the surface on the rear end side of the leading end electrode member 142 is in contact with the surface on the leading end side of the piezoelectric element 141. Moreover, the outer circumferential surface of the leading end electrode member 142 faces the inner circumferential surface of the pressure member 149.

(First Rear End Electrode Member)

The first rear end electrode member 143 shows a disk shape as a whole. The first rear end electrode member 143 is composed of a metallic material having conductivity, high resistance to heat, and small difference in thermal expansion with the piezoelectric element 141, such as stainless steel.

The first rear end electrode member 143 is disposed inside the pressure member 149 provided inside the leading end side housing 131. Then, the first rear end electrode member 143 is disposed on the rear end side of the piezoelectric element 141 and on the leading end side of the second rear end electrode member 144. Here, the first rear end electrode member 143 is disposed inside the insulating pipe 160 provided inside the pressure member 149. Moreover, the outer diameter of the first rear end electrode member 143 is substantially the same as the outer diameter of the piezoelectric element 141 and is slightly smaller than the inner diameter of the insulating pipe 160. Then, the surface on the leading end side of the first rear end electrode member 143 is in contact with the surface on the rear end side of the piezoelectric element 141. On the other hand, the surface on the rear end side of the first rear end electrode member 143 is in contact with the surface on the leading end side of the second rear end electrode member 144. Moreover, the outer circumferential surface of the first rear end electrode member 143 faces the inner circumferential surface of the insulating pipe 160.

In this manner, by providing the insulating pipe 160 between the inner circumferential surface of the pressure member 149 and the outer circumferential surface of the first rear end electrode member 143, the pressure member 149 and the first rear end electrode member 143 are not directly in contact with each other.

(Second Rear End Electrode Member)

The second rear end electrode member 144 shows a spinning-top shape as a whole and a cross section thereof shows a T shape. The second rear end electrode member 144 is composed of a metallic material having conductivity and high resistance to heat, such as stainless steel. The second rear end electrode member 144 includes: a main body part 144a that shows a disk shape and is positioned at the leading end side; a first convex part 144b that shows a columnar shape and projects from the center portion on the surface on the rear end side of the main body part 144a toward the rear end side; and a second convex part 144c that shows a disk shape and projects from the rear end of the first convex part 144b toward the rear end side further. Here, the diameter of the first convex part 144b is smaller than the diameter of the main body part 144a, and the diameter of the second convex part 144c is smaller than the first convex part 144b.

The second rear end electrode member 144 is disposed inside the pressure member 149 provided inside the leading end side housing 131. Here, the leading end side of the main body part 144a in the second rear end electrode member 144 is disposed inside the insulating pipe 160 provided inside the pressure member 149. In contrast thereto, a portion on the rear end side thereof in the second rear end electrode member 144 is disposed outside the insulating pipe 160. Moreover, the outer diameter of the main body part 144a in the second rear end electrode member 144 is substantially the same as the outer diameter of the piezoelectric element 141 and is slightly smaller than the inner diameter of the insulating pipe 160. Then, the surface on the leading end side of the main body part 144a in the second rear end electrode member 144 is in contact with the surface on the rear end side of the first rear end electrode member 143. On the other hand, the surface on the rear end side of the main body part 144a is in contact with the surface on the leading end side of the insulating ring 145. Moreover, the leading end side of the outer circumferential surface of the first convex part 144b in the second rear end electrode member 144 is in contact with the inner circumferential surface of the insulating ring 145, and the rear end side thereof faces the inner circumferential surface of the support member 150 via the air gap. Further, the outer circumferential surface of the second convex part 144c in the second rear end electrode member 144 faces the inner circumferential surface of the support member 150 via the air gap, and in addition, is in contact with the conduction member 147 via the first coil spring 146 mounted on the outer circumferential surface. In this manner, by providing the insulating pipe 160, the air gap and the insulating ring 145 between the inner circumferential surface of the pressure member 149 and the outer circumferential surface of the second rear end electrode member 144, the pressure member 149 and the second rear end electrode member 144 are not directly in contact with each other. Moreover, by providing the air gap between the inner circumferential surface of the support member 150 and the outer circumferential surface of the second rear end electrode member 144, the support member 150 and the second rear end electrode member 144 are not directly in contact with each other.

(Insulating Ring)

The insulating ring 145 shows an annular shape as a whole. The insulating ring 145 is composed of a ceramic material having an insulating property and high resistance to heat, such as alumina.

The insulating ring 145 is disposed inside the pressure member 149 provided inside the leading end side housing 131. Then, the insulating ring 145 is positioned on the rear end side of the main body part 144a in the second rear end electrode member 144 and on the leading end side of the support member 150. Here, inside the through hole provided to the insulating ring 145, the first convex part 144b in the second rear end electrode member 144 is disposed. Moreover, the outer diameter of the insulating ring 145 is slightly smaller than the inner diameter of the pressure member 149. Further, the inner diameter of the through hole in the insulating ring 145 is slightly larger than the outer diameter of the first convex part 144b in the second rear end electrode member 144. Then, the surface on the leading end side of the insulating ring 145 is in contact with the surface on the rear end side of the main body part 144a in the second rear end electrode member 144. On the other hand, the surface on the rear end side of the insulating ring 145 is in contact with the surface on the leading end side of the support member 150. Moreover, the outer circumferential surface of the insulating ring 145 faces the inner circumferential surface of the pressure member 149. Further, the inner circumferential surface of the insulating ring 145 faces the outer circumferential surface of the first convex part 144b in the second rear end electrode member 144.

(First Coil Spring)

The first coil spring 146 shows a spiral shape as a whole, and expands and contracts in the centerline direction. The first coil spring 146 is composed of a metallic material having conductivity, which is higher than the conductivity of the leading end side housing 131, such as brass, and the surface thereof is gold-plated.

The first coil spring 146 is provided inside the leading end side housing 131, and is disposed inside the pressure member 149 and inside the support member 150. Then, the first coil spring 146 is disposed on the rear end side of the second rear end electrode member 144 and on the leading end side of the conduction member 147. In other words, the first coil spring 146 is disposed over the second rear end electrode member 144 and the conduction member 147. Here, the leading end side of the first coil spring 146 is wound around the second convex part 144c of the second rear end electrode member 144, and the rear end side of the first coil spring 146 is inserted into the leading end side concave part 147a provided to the leading end side of the conduction member 147. Then, the inner diameter of the first coil spring 146 is larger than the outer diameter of the second convex part 144c and is smaller than the outer inner diameter of the first convex part 144b in the second rear end electrode member 144. On the other hand, the outer diameter of the first coil spring 146 is smaller than the inner diameter of the leading end side concave part 147a in the conduction member 147. As a result, the leading end of the first coil spring 146 is butting against the boundary portion (the stepped part) between the first convex part 144b and the second convex part 144c in the second rear end electrode member 144, and the leading end side of the first coil spring 146 is in contact with the outer circumferential surface of the second convex part 144c in the second rear end electrode member 146. In contrast thereto, the rear end of the first coil spring 146 is butting against the bottom part of the leading end side concave part 147a in the conduction member 147, and the rear end side of the first coil spring 146 is in contact with the inner circumferential surface of the leading end side concave part 147a in the conduction member 147. Moreover, the outer circumference of the first coil spring 146 faces the inner circumferential surface of the support member 150 via the air gap. In this manner, by providing the air gap between the inner circumferential surface of the support member 150 and the first coil spring 146, the support member 150 and the first coil spring 146 are not directly in contact with each other.

(Conduction Member)

The conduction member 147 shows a rod shape as a whole. The conduction member 147 is composed of a metallic material having conductivity, such as brass, and the surface thereof is gold-plated. The conduction member 147 is provided with, at the leading end thereof, the above-described leading end side convex part 147a, and at the rear end thereof, the rear end side convex part 147b having a diameter smaller than that of the center portion in the centerline direction and projecting toward the rear end side.

The conduction member 147 is disposed inside the leading end side housing 131, and almost all the portions thereof except for the leading end portion and the rear end portion (the rear end side convex part 147b) are disposed inside the holding member 148. Moreover, the leading end side of the conduction member 147 is positioned inside the pressure member 149, the rear end side of the conduction member 147 is positioned inside the housing member 152, and a middle portion thereof between the leading end side and the rear end side is positioned inside the second coil spring 151. Then, the conduction member 147 is disposed on the rear end side of the first coil spring 146 and on the leading end side of the circuit board 153. The conduction member 147 is disposed to penetrate through the through hole provided to the holding member 148 along the centerline direction. Then, the outer diameter of the leading end portion of the conduction member 147 (the portion not covered with the holding member 148) is larger than the inner diameter of the holding member 148 and is smaller than the inner diameter of the support member 150. Further, the outer diameter of the rear end portion of the conduction member 147 (the rear end side convex part 147b) is substantially the same as an inner width of a holding part provided to the holding member 148. Still further, the outer diameter of the center portion of the conduction member 147 in the centerline direction is substantially the same as the inner diameter of the holding member 148. Then, the leading end side concave part 147a of the conduction member 147 is in contact with the first coil spring 146 by inserting the rear end side of the first coil spring 146 into the leading end side concave part 147a. On the other hand, the rear end side convex part 147b of the conduction member 147 is set into the holding part provided to the holding member 148. Moreover, the outer circumferential surface of the leading end portion of the conduction member 147 faces the inner circumferential surface of the support member 150 via the air gap. Further, the outer circumferential surface of the center portion of the conduction member 147 in the centerline direction faces the second coil spring 151 via the holding member 148 and the air gap. Still further, the outer circumferential surface of the rear end portion of the conduction member 147 faces the inner circumferential surface of the housing member 152 via the air gap and the holding member 148. In this manner, by providing the air gap and the holding member 148 between the inner circumferential surface of the support member 150 and the outer circumferential surface of the conduction member 147, the support member 150 and the conduction member 147 are not directly in contact with each other. Moreover, by providing the air gap and the holding member 148 between the inner circumferential surface of the second coil spring 151 and the outer circumferential surface of the conduction member 147, the second coil spring 151 and the conduction member 147 are not directly in contact with each other. Further, by providing the air gap between the inner circumferential surface of the housing member 152 and the outer circumferential surface of the conduction member 147, the housing member 152 and the conduction member 147 are not directly in contact with each other.

(Holding Member)

The holding member 148 is formed by integrating a portion positioned on the leading end side and showing a cylindrical shape and a portion positioned on the rear end side and showing a plate-like shape. The holding member 148 includes a base material composed of a synthetic resin material having an insulating property, such as PPT (Polypropylene Terephthalate), wiring composed of a metallic material having conductivity, such as copper, terminals, and so forth. In the portion positioned on the leading end side of the holding member 148, the conduction member 147 is housed, and, to the portion positioned on the rear end side of the holding member 148, the circuit board 153 is mounted. In this manner, the holding member 148 has a function of holding the conduction member 147 and the circuit board 153.

Of the holding member 148, a portion (the outer circumferential surface) facing the support member 150, the second coil spring 151 and the housing member 152 is composed of the synthetic resin material, to thereby prevent a metallic material from being exposed in the portion. Moreover, of the holding member 148, a portion (the inner circumferential surface) facing the middle portion positioned between the leading end portion and the rear end portion of the conduction member 147 is also composed of the synthetic resin material, to thereby prevent a metallic material from being exposed in the portion. Moreover, on the rear end side of the cylindrical portion in the holding member 148, the holding part, which is composed of a metallic material and sets the rear end side convex part 147b of the conduction member 147 in to hold thereof, is provided. To the holding part, wiring for electrically connecting to a signal input terminal (not shown) of the circuit board 153 is attached.

The holding member 148 is provided over the inner portion of the leading end side housing 131 and the inner portion of the rear end side housing 133. Moreover, the leading end side of the holding member 148 is positioned inside the pressure member 149, the rear end side of the conduction member 147 is positioned inside the housing member 152, and a middle portion thereof between the leading end side and the rear end side is positioned inside the second coil spring 151. Then, the holding member 148 is disposed on the rear end side of the insulating ring 145 and on the leading end side of the connection member 154.

The outer diameter of the cylindrical portion positioned on the leading end side of the holding member 148 is smaller than the inner diameter of the support member 150 and the outer diameter of the plate-like portion positioned on the rear end side of the covering member is smaller than the inner diameter of the housing member 152 at the portion. Moreover, the outer circumferential surface on the leading end side of the cylindrical portion of the holding member 148 faces the inner circumferential surface of the support member 150 and the inner circumferential surface of the second coil spring 151 via the air gap. Further, the outer circumferential surface on the rear end side of the cylindrical portion and the outer circumferential surface of the plate-like portion in the holding member 148 are in contact with the inner circumferential surface of the housing member 152 or face the inner circumferential surface of the holding member 152 via the air gap.

(Pressure Member)

The pressure member 149 as an example of the first housing or a first imparting member shows a cylindrical shape as a whole. The pressure member 149 is composed of a metallic material having conductivity and high resistance to heat, such as stainless steel.

Figure 15:
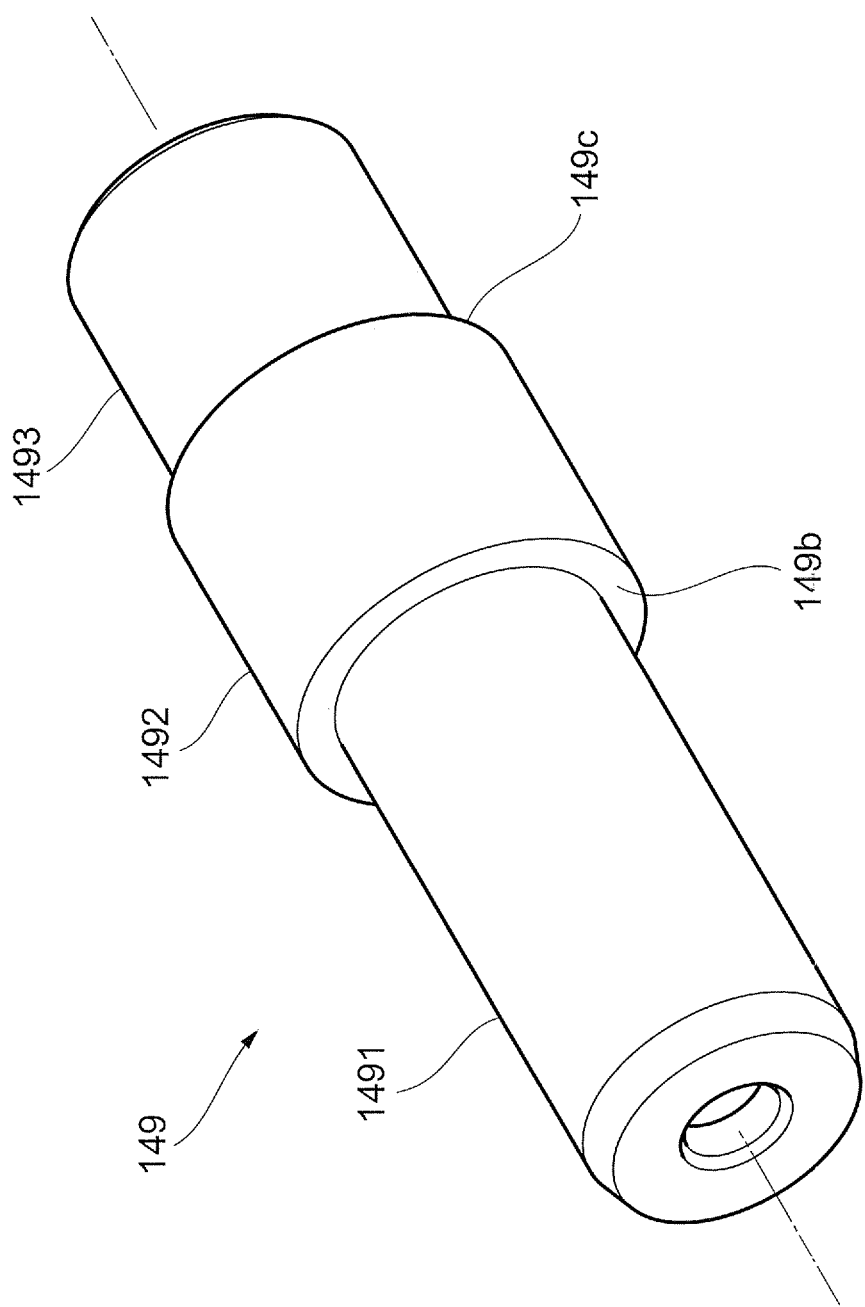
FIG. 15 is a perspective view of a pressure member.

FIG. 15 is a perspective view of the pressure member 149. Hereinafter, also with reference to FIG. 15, a configuration of the pressure member 149 will be described. Note that, in FIG. 15, the lower left side in the figure indicates the leading end side and the upper right side in the figure indicates the rear end side.

The pressure member 149 of the exemplary embodiment includes: a leading end cylindrical part 1491 that is positioned at the most leading end side and is provided with an opening part at the leading end thereof; a middle cylindrical part 1492 that is disposed at the rear end side of the leading end cylindrical part 1491; and a rear end cylindrical part 1493 that is positioned on the rear end side of the middle cylindrical part 1492 and at the most rear end side. In the pressure member 149, the outer diameter of the middle cylindrical part 1492 is larger than those of the leading end cylindrical part 1491 and the rear end cylindrical part 1493, and the outer diameter of the rear end cylindrical part 1493 is larger than that of the leading end cylindrical part 1491. Then, the pressure member 149 further includes: a leading end stepped part 149b that connects the leading end cylindrical part 1491 and the middle cylindrical part 1492 at a boundary portion therebetween; and a rear end stepped part 149c that connects the middle end cylindrical part 1492 and the rear end cylindrical part 1493 at a boundary portion therebetween. Note that the inner diameter of the pressure member 149 is the same size except for the opening part provided to the leading end. Therefore, in the pressure member 149, the thickness of the middle cylindrical part 1492 is larger than the thickness of the rear end cylindrical part 1493, and the thickness of the rear end cylindrical part 1493 is larger than the thickness of the leading end cylindrical part 1491. Consequently, in the pressure member 149, the middle cylindrical part 1492 is least likely to be deformed, whereas, the leading end cylindrical part 1491 is most likely to be deformed (likely to function as a spring). Here, in the exemplary embodiment, the leading end stepped part 149b, the middle cylindrical part 1492 and the rear end stepped part 149c function as an example of the projection part.

Moreover, of the pressure member 149, on the outer circumferential surface of each of the leading end stepped part 149b, the middle cylindrical part 1492 and the rear end stepped part 149c, an insulating film 149a successively formed by coating a ceramic material, which includes alumina, zirconia or the like, showing the insulating property is provided (refer to FIG. 14). Here, in the exemplary embodiment, the insulating film 149a functions as an example of the insulating part.

The pressure member 149 is provided inside the leading end side housing 131 so that the leading end cylindrical part 1491 is on the leading end side. Inside the pressure member 149, the piezoelectric element 141, the leading end electrode member 142, the first rear end electrode member 143, the second rear end electrode member 144, the insulating ring 145, the leading end side of the support member 150, the insulating pipe 160, the first coil spring 146, the leading end side of the conduction member 147 and the leading end side of the holding member 148 are housed. Then, the pressure member 149 is disposed on the rear end side of the diaphragm head 132 and on the leading end side of the housing member 152. Moreover, the outer diameter of the pressure member 149 differs among the leading end cylindrical part 1491, the middle cylindrical part 1492 and the rear end cylindrical part 1493; however, at all the positions, the outer diameter of the pressure member 149 is smaller than the inner diameter of the leading end side housing 131. Further, the inner diameter of the pressure member 149 is, at the positions facing the leading end electrode member 142 and the insulating pipe 160 (the piezoelectric element 141, the first rear end electrode member 143, the second rear end electrode member 144 and the insulating ring 145), slightly larger than the outer diameters of these components, and at the position facing the support member 150, substantially the same as the outer diameter of the support member 150.

Here, between the outer circumferential surface of the rear end cylindrical part 1493 provided to the rear end side of the pressure member 149 and the inner circumferential surface on the rear end side of the first leading end side housing 1311, the butting pipe 157 is disposed.

Then, the surface on the leading end side (surface on the front side of the opening part) of the leading end cylindrical part 1491 in the pressure member 149 faces the convex part 132c of the diaphragm head 132 via the air gap. On the other hand, the rear end side of the rear end cylindrical part 1493 faces the first insulating member 161 via the air gap. Moreover, the outer circumferential surface of the leading end cylindrical part 1491 faces the inner circumferential surface of the first leading end side housing 1311 via the air gap. Further, the outer circumferential surfaces of the leading end stepped part 149b, the middle cylindrical part 1492 and the rear end stepped part 149c are in contact with the insulating film 149a, and face the inner circumferential surface of the first leading end side housing 1311 via the insulating film 149a. Still further, the outer circumferential surface of the rear end cylindrical part 1493 faces the inner circumferential surface of the butting pipe 157 via the air gap. In this manner, by providing the air gap and the insulating film 149a between the outer circumference of the pressure member 149 and the inner circumferential surfaces of the first leading end side housing 1311 and the inner circumferential surfaces of the butting pipe 157, the pressure member 149 is not directly in contact with the first leading end side housing 1311 and the butting pipe 157.

(Support Member)

The support member 150 as an example of a second imparting member shows a cylindrical shape as a whole. The support member 150 is composed of a metallic material having conductivity and high resistance to heat, such as stainless steel.

The support member 150 is disposed inside the leading end side housing 131, and the leading end side thereof is positioned inside the pressure member 149 and the rear end side thereof is positioned outside the pressure member 149. Moreover, the support member 150 houses, inside thereof, the rear end side of the second rear end electrode member 144 (the first convex part 144b and the second convex part 144c), the first coil spring 146, the leading end side of the conduction member 147 and the leading end side of the holding member 148. Then, the support member 150 is disposed on the rear end side of the insulating ring 145 and on the leading end side of the housing member 152. Moreover, the outer diameter of the support member 150 is substantially the same as the inner diameter of the pressure member 149. Further, the inner diameter of the support member 150 is different depending on the positions in the centerline direction; the inner diameter of the support member 150 is larger than the outer diameter of the second rear end electrode member 144 at the position facing the second rear end electrode member 144, larger than the outer diameter of the first coil spring 146 at the position facing the first coil spring 146, larger than the outer diameter of the conduction member 147 at the position facing the conduction member 147, and larger than the outer diameter of the holding member 148 at the position facing the holding member 148. Then, the surface of the leading end side (surface on the front side of the opening part) of the support member 150 is in contact with the surface on the rear end side of the insulating ring 145. On the other hand, the surface on the rear end side of the support member 150 faces the housing member 152 via the air gap. Moreover, the leading end side of the outer circumferential surface of the support member 150 is in contact with the inner circumferential surface of the pressure member 149, and the rear end side of the outer circumferential surface of the support member 150 is in contact with the leading end side of the second coil spring 151. By a second welding part 159 obtained by laser welding applied around the inner circumferential surface of the rear end side in the pressure member 149 and the outer circumferential surface of the support member 150 facing the portion, the pressure member 149 and the support member 150 are joined and fixed. In contrast thereto, the inner circumferential surface of the support member 150 faces the second rear end electrode member 144, the first coil spring 146, the conduction member 147 and the holding member 148 via the air gap. In this manner, by providing the air gap between the inner circumferential surface of the support member 150 and the second rear end electrode member 144, the first coil spring 146, the conduction member 147 and the holding member 148, the support member 150 is not directly in contact with the second rear end electrode member 144, the first coil spring 146, the conduction member 147 and the holding member 148.

(Second Coil Spring)

The second coil spring 151 shows a spiral shape as a whole, and expands and contracts in the centerline direction. The second coil spring 151 is composed of a metallic material having conductivity and high resistance to heat, such as stainless steel, and the surface thereof is gold-plated. In this manner, in the exemplary embodiment, the material is different between the first coil spring 146 and the second coil spring 151.

The second coil spring 151 is disposed inside the leading end side housing 131, and the leading end side thereof is positioned on the rear end side and outside of the support member 150 and the rear end side thereof is positioned on the leading end side and outside of the housing member 152. In other words, the second coil spring 151 is disposed over the support member 150 and the housing member 152. Moreover, the outer diameter of the second coil spring 151 is smaller than the inner diameter of the leading end side housing 131 (more specifically, the second leading end side housing 1312). Further, the inner diameter of the second coil spring 151 is slightly smaller than the outer diameter on the rear end side of the support member 150 and the outer diameter on the leading end side of the housing member 152. Then, the outer circumference of the second coil spring 151 faces the inner circumferential surface of the leading end side housing 131 via the air gap. In this manner, by providing the air gap between the outer circumference of the second coil spring 151 and the inner circumferential surface of the leading end side housing 131, the second coil spring 151 and the leading end side housing 131 are not directly in contact with each other.

(Housing Member)

The housing member 152 shows a cylindrical shape as a whole. The housing member 152 is composed of a metallic material having conductivity, which is higher than the conductivity of the leading end side housing 131, such as brass or stainless steel, and the surface thereof is gold-plated.

Figure 16:
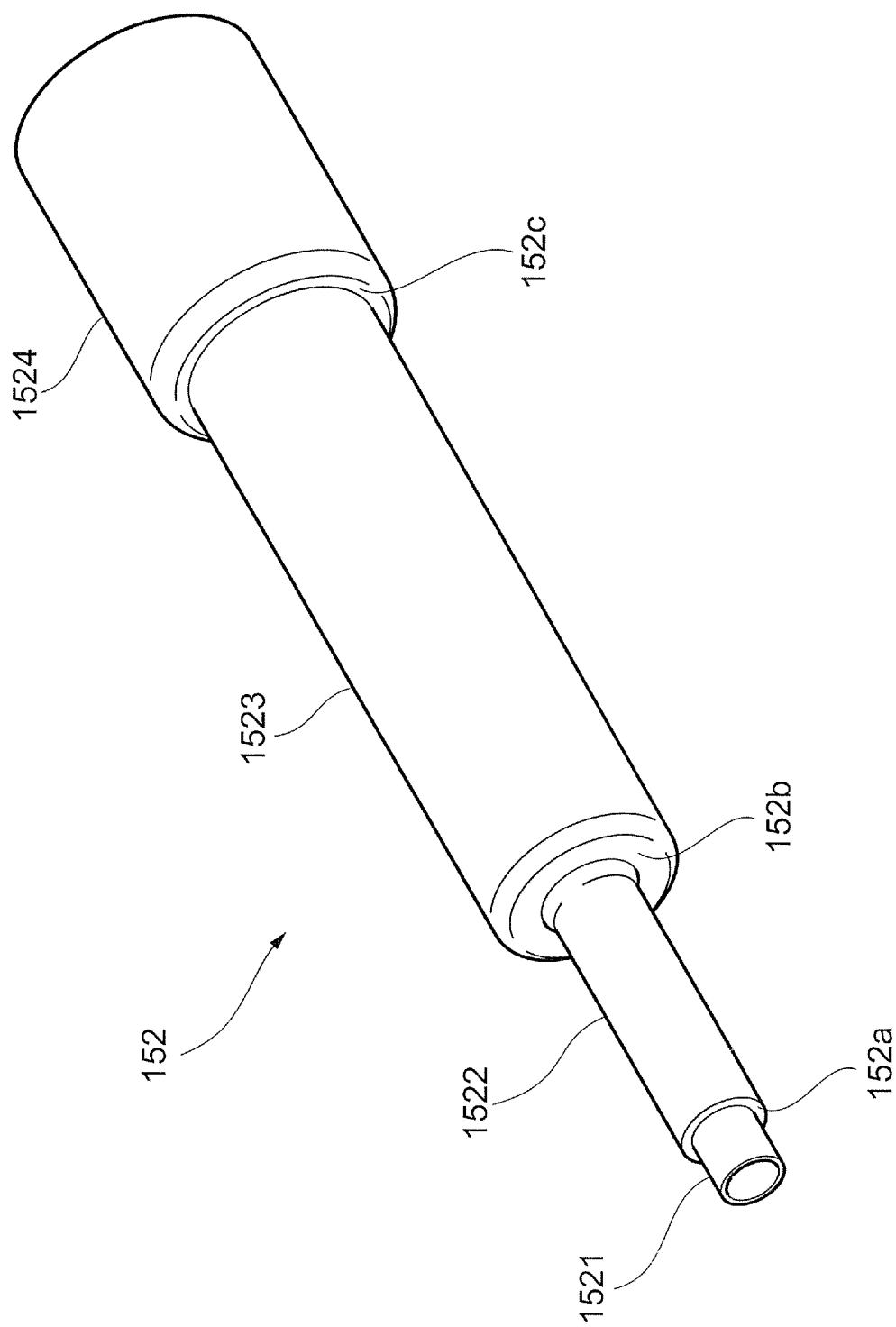
FIG. 16 is a perspective view of a housing member.

FIG. 16 is a perspective view of the housing member 152. Hereinafter, also with reference to FIG. 16, a configuration of the housing member 152 will be described. Note that, also in FIG. 16, the lower left side in the figure indicates the leading end side and the upper right side in the figure indicates the rear end side.

The housing member 152 of the exemplary embodiment includes: a first cylindrical part 1521 that is positioned at the most leading end side and is provided with an opening part at the leading end thereof; a second cylindrical part 1522 that is disposed at the rear end side of the first cylindrical part 1521; a third cylindrical part 1523 that is positioned on the rear end side of the second cylindrical part 1522; and a fourth cylindrical part 1524 that is positioned on the rear end side of the third cylindrical part 1523. In the housing member 152, the outer diameter becomes larger in the order of the first cylindrical part 1521, the second cylindrical part 1522, the third cylindrical part 1523 and the fourth cylindrical part 1524. In other words, in the housing member 152, the diameter increases in a stepwise manner (four steps) from the leading end side toward the rear end side. Then, the housing member 152 further includes: a first stepped part 152a that connects the first cylindrical part 1521 and the second cylindrical part 1522 at a boundary portion therebetween; a second stepped part 152b that connects the second cylindrical part 1522 and the third cylindrical part 1523 at a boundary portion therebetween; and a third stepped part 152c that connects the third cylindrical part 1523 and the fourth cylindrical part 1524 at a boundary portion therebetween. Note that, in the housing member 152, different from the above-described pressure member 149, the thickness thereof is set at a certain size regardless of the position in the centerline direction. Therefore, in the housing member 149, the inner diameter becomes larger in the order of the first cylindrical part 1521, the second cylindrical part 1522, the third cylindrical part 1523 and the fourth cylindrical part 1524.

The housing member 152 is provided over the inner portion of the leading end side housing 131 and the inner portion of the rear end side housing 133 so that the first cylindrical part 1521 is on the leading end side. Inside the housing member 152, the rear end side of the conduction member 147, the rear end side of the holding member 148, the circuit board 153 and the ground plate 155 are housed. Then, the housing member 152 is disposed on the rear end side of the support member 150 and on the leading end side of the connection member 154. Moreover, the outer diameter of the housing member 152 differs among the first cylindrical part 1521, the second cylindrical part 1522, the third cylindrical part 1523 and the fourth cylindrical part 1524; however, at all the positions, the outer diameter of the housing member 152 is smaller than the inner diameters of the leading end side housing 131 and the rear end side housing 133. Further, the inner diameter of the housing member 152 also differs among the first cylindrical part 1521, the second cylindrical part 1522, the third cylindrical part 1523 and the fourth cylindrical part 1524; however, the inner diameter of the housing member 152 is larger than the outer diameter of each member housed inside thereof.

Here, between the rear end side of the second cylindrical part 1522 and the second stepped part 152b in the housing member 152 and the inner circumferential surface of the second leading end side housing 1312, the first insulating member 161 is disposed. Moreover, between the rear end side of the third cylindrical part 1523 and the third stepped part 152c in the housing member 152 and the inner circumferential surface of the second leading end side housing 1312, the second insulating member 162 is disposed. Further, between the fourth cylindrical part 1524 in the housing member 152 and the first rear end side housing 1331, the third insulating member 163 is disposed.

Then, the surface on the leading end side (surface on the front side of the opening part) of the first cylindrical part 1521 in the housing member 152 faces the surface on the rear end side of the support member 150 via the air gap. Moreover, the first cylindrical part 1521 is in contact with the second coil spring 151. On the other hand, the rear end side of the fourth cylindrical part 1524 faces the holding member 148. Moreover, the outer circumferential surface of the first cylindrical part 1521 and the first stepped part 152a faces the inner circumferential surface of the second leading end side housing 1312 via the air gap. Further, the outer circumferential surface of the second cylindrical part 1522 faces the inner circumferential surface of the second leading end side housing 1312 via the air gap and the first insulating member 161. Still further, the second stepped part 152*b* faces the inner circumferential surface of the second leading end side housing 1312 via the first insulating member 161. Moreover, the outer circumferential surface of the third cylindrical part 1523 faces the inner circumferential surface of the second leading end side housing 1312 via the air gap and the second insulating member 162. Further, the outer circumferential surface of the third stepped part 152*c* faces the inner circumferential surface of the second leading end side housing 1312 via the second insulating member 162. Further, the outer circumferential surface of the fourth cylindrical part 1524 faces the inner circumferential surface of the second leading end side housing 1312 via the air gap, and faces the inner circumferential surface of the first rear end side housing 1331 via the air gap and the third insulating member 163. In this manner, by providing the air gap, the first insulating member 161, the second insulating member 162 and the third insulating member 163 between the outer circumference of the housing member 152 and the second leading end side housing 1312 and the first rear end side housing 1331, the housing member 152 is not directly in contact with the second leading end side housing 1312 and the first rear end side housing 1331.

(Circuit Board)

The circuit board 153 shows a rectangular plate shape as a whole. The circuit board 153 performs various kinds of processing using electric circuits to an electric signal caused by a weak charge outputted by the piezoelectric element 141 in response to the received pressure, and is configured with a so-called printed wiring board. The circuit board 153 is provided over the inner portion of the leading end side housing 131 and the inner portion of the rear end side housing 133. Moreover, the circuit board 153 is disposed on the rear end side of the conduction member 147 and on the leading end side of the connection member 154. Further, the circuit board 153 is installed to the holding member 148 and the entirety thereof is disposed inside the housing member 152.

On the circuit board 153, there are installed: an integrating circuit that integrates an input signal (charge signal) inputted from the piezoelectric element 141 to convert thereof into a voltage signal; an amplifier circuit that amplifies the voltage signal inputted from the integrating circuit to generate an output signal; and a power supply circuit that serves as a power supply for elements, such as operational amplifiers, constituting these integrating circuit and amplifier circuit (all of them are not shown in the figure).

(Connection Member)

The connection member 154 shows a columnar shape as a whole. The connection member 154 includes a base material composed of a synthetic resin material having an insulating property, such as PPT, wiring composed of a metallic material having conductivity, such as copper, terminals, and so forth. However, of the connection member 154, the portion (the outer circumferential surface) to be brought into contact with or to face the second rear end side housing 1332 is composed of the synthetic resin material, to thereby prevent a metallic material from being exposed in the portion. Moreover, on the rear end side of the connection member 154, an opening part having a concave shape and opening toward the rear end side is provided. Then, on the leading end side of the connection member 154, there is provided a board-side connector 154*a* that projects toward the leading end side and is electrically connected to the circuit board 153. On the other hand, on the rear end side of the connection member 154 and inside the above-described opening part, there is provided a cable-side connector 154*b* that projects toward the rear end side and is to be connected to the connection cable 90 shown in FIG. 1. Moreover, a concave part is provided around the outer circumferential surface of the leading end side in the connection member 154, and the O-ring 156 is attached to the concave part.

The leading end side of the connection member 154 is positioned inside the second rear end side housing 1332, and the rear end side thereof is positioned outside the second rear end side housing 1332. Then, inside the second rear end side housing 1332, the O-ring 156 attached to the outer circumferential surface of the connection member 154 is in contact with the inner circumferential surface of the second rear end side housing 1332.

The outer diameter of the cylindrical portion positioned on the leading end side of the connection member 154 is smaller than the inner diameter of the second rear end side housing 1332. In contrast thereto, the outer diameter of the cylindrical portion positioned on the rear end side of the connection member 154 is substantially the same as the outer diameter of the second rear end side housing 1332. Moreover, the leading end side of the connection member 154 faces the inner circumferential surface of the second rear end side housing 1332 via the air gap or the O-ring 156.

(Ground Plate)

The ground plate 155 shows a strip shape as a whole. The ground plate 155 is composed of a metallic material having conductivity, such as phosphor bronze, and the surface thereof is gold-plated.

The ground plate 155 is provided over the inner portion of the leading end side housing 131 and the inner portion of the rear end side housing 133; the leading end thereof is positioned inside the housing member 152 and above the circuit board 153, and the rear end thereof projects toward the rear end side than the rear end of the housing member 152. Then, the leading end side of the ground plate 155 is electrically connected to the ground terminal (not shown) of the circuit board 153, and the rear end side of the ground plate 155 is electrically connected to the inner circumferential surface of the fourth cylindrical part 1524 in the housing member 152.

(O-Ring)

The O-ring 156 shows an annular shape as a whole. The O-ring 156 is composed of a synthetic resin material having the insulating property and high resistance to heat, permeability and acids, such as PTFE (Polytetrafluoroethylen).

The O-ring 156 is attached to the outer circumferential surface of the connection member 154, and is to be sandwiched between the outer circumferential surface of the connection member 154 and the inner circumferential surface of the second rear end side housing 1332 when the connection member 154 is attached to the second rear end side housing 1332.

(Butting Pipe)

The butting pipe 157 as an example of a fixing member shows a cylindrical shape as a whole. The butting pipe 157 is composed of a metallic material having conductivity and high resistance to heat, such as stainless steel.

The butting pipe 157 is disposed inside a region in the leading end side housing 131 where the first leading end side housing 1311 and the second leading end side housing 1312 overlap each other and inside the first leading end side housing 1311. Then, the butting pipe 157 is positioned on the rear end side of the middle cylindrical part 1492 in the pressure member 149 and on the leading end side of the first insulating member 161. Moreover, the outer diameter of the butting pipe 157 is substantially the same as the inner diameter of the rear end side in the first leading end side housing 1311 that houses the butting pipe 157. On the other hand, the inner diameter of the butting pipe 157 is larger than the outer diameter of the rear end cylindrical part 1493 in the pressure member 149. Then, the surface on the leading end side of the butting pipe 157 is in contact with the rear end stepped part 149*c* (the formation surface of the insulating film 149*a*) in the pressure member 149. On the other hand, the surface on the rear end side of the butting pipe 157 faces the surface on the leading end side of the first insulating member 161 via the air gap. Moreover, the outer circumferential surface of the butting pipe 157 is in contact with the inner circumferential surface on the rear end side of the first leading end side housing 1311. By a first welding part 158 obtained by laser welding applied around the inner circumferential surface of the rear end side in the first leading end side housing 1311 and the outer circumferential surface of the butting pipe 157 facing the portion, the first leading end side housing 1311 and the butting pipe 157 are joined and fixed. In contrast thereto, the inner circumferential surface of the butting pipe 157 faces the outer circumferential surface of the rear end cylindrical part 1493 in the pressure member 149 via the air gap. In this manner, by providing the insulating film 149*a* and the air gap between the rear end stepped part 149*c* and the rear end cylindrical part 1493 in the pressure member 149 and the butting pipe 157, the butting pipe 157 and the pressure member 149 are not directly in contact with each other.

(First Welding Part)

The first welding part 158 is formed by laser welding applied around the inner circumferential surface of the rear end side in the first leading end side housing 1311 and the outer circumferential surface of the butting pipe 157.

(Second Welding Part)

The second welding part 159 is formed by laser welding applied around the inner circumferential surface of the rear end side in the pressure member 149 and the outer circumferential surface of the support member 150.

(Insulating Pipe)

The insulating pipe 160 shows a cylindrical shape as a whole. The insulating pipe 160 is composed of a synthetic resin material having an insulating property, such as LCP (Liquid Crystal Polymer). The insulating pipe 160 is disposed inside the pressure member 149 provided inside the leading end side housing 131. Inside the insulating pipe 160, the piezoelectric element 141, the first rear end electrode member 143 and the leading end side of the main body part 144*a* in the second rear end electrode member 144 are housed. Then, the insulating pipe 160 is disposed on the rear end side of the leading end electrode member 142 and on the leading end side of the insulating ring 145. Moreover, the outer diameter of the insulating pipe 160 is slightly smaller than the inner diameter of the pressure member 149. Further, the inner diameter of the insulating pipe 160 is slightly larger than the outer diameter of each of the piezoelectric element 141, the first rear end electrode member 143 and the main body part 144*a* in the second rear end electrode member 144. Then, the leading end side of the insulating pipe 160 faces the surface on the rear end side of the leading end electrode member 142. On the other hand, the rear end side of the insulating pipe 160 faces the surface on the leading end side of the insulating ring 145. Moreover, the outer circumferential surface of the insulating pipe 160 faces the inner circumferential surface of the pressure member 149. Further, the inner circumferential surface of the insulating pipe 160 faces the outer circumferential surfaces of the piezoelectric element 141, the first rear end electrode member 143 and the main body part 144*a* in the second rear end electrode member 144. In this manner, by providing the insulating pipe 160 and the air gap formed by the insulating pipe 160 between the pressure member 149 and the piezoelectric element 141, the first rear end electrode member 143 and the main body part 144*a* in the second rear end electrode member 144, the first pressure member 149 is not directly in contact with the first rear end electrode member 143 and the second rear end electrode member 144.

(First Insulating Member)

The first insulating member 161 shows a cylindrical shape in the leading end side thereof and an annular shape in the rear end side thereof. The first insulating member 161 is composed of a ceramic material having an insulating property and high resistance to heat, such as alumina.

The first insulating member 161 is disposed inside the leading end side housing 131. Then, the first insulating member 161 is disposed outside the second cylindrical part 1522 and the second stepped part 152*b* in the housing member 152 (refer to FIG. 16). Moreover, the outer diameter of the first insulating member 161 is slightly smaller than the inner diameter of the second leading end side housing 1312 of the corresponding portion, and the inner diameter of the first insulating member 161 is slightly larger than the outer diameter of the housing member 152 of the corresponding portion. Then, the outer circumferential surface of the first insulating member 161 is in contact with the second leading end side housing 1312, and the inner circumferential surface of the first insulating member 161 is in contact with the housing member 152.

(Second Insulating Member)

The second insulating member 162 shows an annular shape as a whole. The second insulating member 162 is composed of a ceramic material having an insulating property and high resistance to heat, such as alumina.

The second insulating member 162 is disposed at a position on the rear end side than the first insulating member 161 inside the leading end side housing 131. Then, the second insulating member 162 is disposed outside the third cylindrical part 1523 and the third stepped part 152*c* in the housing member 152 (refer to FIG. 16). Moreover, the outer diameter of the second insulating member 162 is slightly smaller than the inner diameter of the second leading end side housing 1312 of the corresponding portion, and the inner diameter of the second insulating member 162 is slightly larger than the outer diameter of the housing member 152 of the corresponding portion. Then, the outer circumferential surface of the second insulating member 162 is in contact with the second leading end side housing 1312, and the inner circumferential surface of the second insulating member 162 is in contact with the housing member 152.

In this manner, by providing the air gap, the first insulating member 161 and the second insulating member 162 between the leading end side housing 131 (the second leading end side housing 1312) and the housing member 152, the leading end side housing 131 and the housing member 152 are not directly in contact with each other.

(Third Insulating Member)

The third insulating member 163 shows a cylindrical shape as a whole. The third insulating member 163 is composed of a ceramic material having an insulating property and high resistance to heat, such as alumina.

The third insulating member 163 is disposed at a position on the rear end side than the second insulating member 162 inside the rear end side housing 133. Then, the third insulating member 163 is positioned outside the fourth cylindrical part 1524 in the housing member 152. Moreover, the outer diameter of the third insulating member 163 is substantially the same as the inner diameter of the first rear end side housing 1331, and the inner diameter of the third insulating member 163 is larger than the outer diameter of the fourth cylindrical part 1524 in the housing member 152. Then, the outer circumferential surface of the third insulating member 163 is in contact with the inner circumferential surface of the first leading end side housing 1331, and part on the leading end side of the inner circumferential surface of the third insulating member 163 is in contact with the housing member 152 and the other part thereof faces the housing member 152 via the air gap.

[Configuration of Sealing Part]

The sealing part 170 includes a first sealing member 171 that is positioned relatively close to the leading end side thereof and a second sealing member 172 that is positioned relatively close to the rear end side thereof. Note that, in the state where the pressure detection device 20 is attached to the internal combustion engine 10, the first sealing member 171 and the second sealing member 172 butt the inner circumferential surface of the communication hole 13a provided to the cylinder head 13 (refer to FIG. 1).

(First Sealing Member)

The first sealing member 171 has a hollow structure and shows a cylindrical shape as a whole. The first sealing member 171 is composed of a synthetic resin material having an insulating property and high resistance to heat and acids, such as PTFE.

The first sealing member 171 is set in the concave part 1311a provided to the outer circumferential surface of the first leading end side housing 1311. Then, the inner diameter thereof is slightly smaller than the outer diameter of the concave part 1311a and the outer diameter thereof is slightly larger than the inner diameter of the communication hole 13a.

(Second Sealing Member)

The second sealing member 172 shows an annular shape as a whole, and an O-ring is used here. The second sealing member 172 is also composed of a synthetic resin material having an insulating property and high resistance to heat and acids, such as PTFE.

The second sealing member 172 is set in the concave part 1312a provided to the outer circumferential surface of the second leading end side housing 1312. Then, the inner diameter thereof is slightly smaller than the outer diameter of the concave part 1312a and the outer diameter thereof is slightly larger than the inner diameter of the communication hole 13a.

[Electrical Connection Structure in Pressure Detection Device]

Here, the electrical connection structure in the pressure detection device 20 will be described.

(Positive Route)

In the pressure detection device 20, an end surface on the rear end side of the piezoelectric element 141 (positive pole) is electrically connected to the conduction member 147 made of metal via the first rear end electrode member 143 made of metal, the second rear end electrode member 144 made of metal and the first coil spring 146 made of metal. Then, the conduction member 147 made of metal is electrically connected to an input terminal (not shown) provided to the circuit board 153 via the holding part, wiring and terminal made of metal provided to the holding member 148. Hereinafter, an electrical route from the surface on the rear end side of the piezoelectric element 141 to the circuit board 153 via the first rear end electrode member 143, the second rear end electrode member 144, the first coil spring 146, the conduction member 147 and the holding member 148 is referred to as "positive route".

(Negative Route)

On the other hand, in the pressure detection device 20, an end surface on the leading end side of the piezoelectric element 141 (negative pole) is electrically connected to the ground terminal (not shown) provided to the circuit board 153 via the leading end electrode member 142 made of metal, the pressure member 149 made of metal, the support member 150 made of metal (the second welding part 159), the second coil spring 151 made of metal, the housing member 152 made of metal and the ground plate 155 made of metal. Hereinafter, an electrical route from the surface on the leading end side of the piezoelectric element 141 to the circuit board 153 via the leading end electrode member 142, the pressure member 149, the support member 150, the second coil spring 151, the housing member 152 and the ground plate 155 is referred to as "negative route".

(Housing Route)

On the other hand, in the pressure detection device 20, the diaphragm head 132 made of metal is electrically connected to the rear end side housing 133 (the first rear end side housing 1331 and the second rear end side housing 1332) made of metal via the leading end side housing 131 (the first leading end side housing 1311 and the second leading end side housing 1312) made of metal. Moreover, in the pressure detection device 20, the first leading end side housing 1311 made of metal is electrically connected to the butting pipe 157 (the first welding part 158) made of metal. Hereinafter, an electrical route from the diaphragm head 132 to the rear end side housing 133 and the butting pipe 157 via the leading end side housing 131 is referred to as "housing route".

(Relationship Between Positive Route and Negative Route)

Here, in the pressure detection device 20 in the exemplary embodiment, the negative route exists outside the positive route. To put it another way, the positive route is housed inside the negative route. Then, the positive route and the negative route are electrically insulated by the insulating pipe 160, the insulating ring 145, the holding member 148 and the air gap formed between both routes. Here, in the exemplary embodiment, the negative route serves as an example of a first electrical route, and the positive route serves as an example of a second electrical route.

(Relationship Between Negative Route and Housing Route)

Moreover, in the pressure detection device 20, the housing route exists outside the negative route. To put it another way, the negative route is housed inside the housing route. Then, the negative route and the housing route are electrically insulated by the insulating film 142a provided to the leading end electrode member 142, the insulating film 149a provided to the pressure member 149, the first insulating member 161, the second insulating member 162, the third insulating member 163 and the air gap formed between both routes.

(Relationship Between Housing Route and Positive Route)

Moreover, in the pressure detection device 20, as a result, the housing route exists outside the positive route. To put it another way, the positive route is housed inside the housing route. Then, as described above, since the positive route and the negative route are electrically insulated, and the negative route and the housing route are electrically insulated, the housing route and the positive route result in being electrically insulated.

(Others)

Here, the housing part 130 constituting the housing route is a portion exposed to the outside in the pressure detection device 20, and in particular, the diaphragm head 132 is a portion facing the combustion chamber C that increases acidity with combustion. In contrast thereto, each portion constituting the positive route and the negative route is a portion housed inside the housing part 130 in the pressure detection device 20. Therefore, it is preferable that each member constituting the positive route and the negative route is composed of a material having conductivity higher than that of each member constituting the housing route (the housing part 130), and it is preferable that each member constituting the housing route (the housing part 130) is composed of a material having resistance to acids higher than that of each member constituting the positive route and the negative route.

[Assembling Procedures of Pressure Detection Device]

Next, assembling procedures of the pressure detection device 20 used in the exemplary embodiment will be described.

First, the leading end side of the first leading end side housing 1311 and the rear surface side (the convex part 132*d* side) of the diaphragm head 132 are caused to face and butt against each other. Then, in this state, laser welding is applied round the boundary portion between the first leading end side housing 1311 and the diaphragm head 132.

Next, into the first leading end side housing 1311 in a structure including the first leading end side housing 1311 and the diaphragm head 132, the pressure member 149 is inserted from the rear end side with the leading end cylindrical part 1491 serving as the leading end side. At this time, insertion of the pressure member 149 is performed until the leading end stepped part 149*b* provided to the outer circumferential surface of the pressure member 149 butts against the inside stepped part 1311*b* provided to the inner circumferential surface of the first leading end side housing 1311. With this, the leading end stepped part 149*b* of the pressure member 149 and the insulating film 149*a* provided to the outer circumferential surface of the middle cylindrical part 1492 are brought into contact with the inner circumferential surface of the first leading end side housing 1311. Moreover, into the opening part provided to the leading end side of the leading end cylindrical part 1491 in the pressure member 149, the convex part 132*d* of the diaphragm head 132 is inserted.

Substantially, between the inner circumferential surface of the first leading end side housing 1311 and the outer circumferential surface of the rear end cylindrical part 1493 in the pressure member 149, the butting pipe 157 is inserted from the rear end side. At this time, until the leading end side of the butting pipe 157 butts against the rear end stepped part 149*c* provided to the pressure member 149, the butting pipe 157 is inserted. With this, the insulating film 149*a* provided to the rear end stepped part 149*c* of the pressure member 149 is brought into contact with the leading end side of the butting pipe 157.

In this state, the rear end side of the first leading end side housing 1311 and the butting pipe 157 are subjected to laser welding around thereof, to thereby form the first welding part 158. At this time, by sandwiching the middle cylindrical part 1492 of the pressure member 149 between the inside stepped part 1311*b* of the first leading end side housing 1311 and the leading end side of the butting pipe 157, the pressure member 149 is fixed to the first leading end side housing 1311. Consequently, the positioning of the pressure member 149 with respect to the first leading end side housing 1311 and the diaphragm head 132 is performed.

Next, into the pressure member 149 in a structure including the first leading end side housing 1311, the diaphragm head 132, the pressure member 149 and the butting pipe 157, the leading end electrode member 142, the insulating pipe 160, the piezoelectric element 141, the first rear end electrode member 143, the second rear end electrode member 144, the insulating ring 145 and the support member 150 are inserted in this order from the rear end side. Note that, when the leading end electrode member 142 is inserted into the pressure member 149, the surface on which the insulating film 142*a* is formed is set to the leading end side. Moreover, when the second rear end electrode member 144 is inserted into the pressure member 149, the main body part 144*a* is set to the leading end side and the second convex part 144*c* is set to the rear end side. At this time, the insulating film 142*a* provided to the leading end side of the leading end electrode member 142 to be housed in the pressure member 149 is brought into contact with the convex part 132*d* provided to the rear end side of the diaphragm head 132. Moreover, inside the insulating pipe 160, the piezoelectric element 141, the first rear end electrode member 143 and the leading end side of the main body part 144*a* in the second rear end electrode member 144 are disposed. Further, the first convex part 144*b* and the second convex part 144*c* of the second rear end electrode member 144 are exposed to the inside of the leading end side of the support member 150 via a hole provided to the insulating ring 145.

In this state, adjustment of position of the support member 150 in the centerline direction with respect to the pressure member 149 is performed, and thereby the load (preload) applied to the piezoelectric element 141 via the pressure member 149 and the support member 150 is adjusted.

Then, after the adjustment of position of the support member 150 in the centerline direction with respect to the pressure member 149 is finished, the rear end side of the pressure member 149 and the support member 150 are subjected to laser welding around thereof, to thereby form the second welding part 159. At this time, the leading end side of the piezoelectric element 141 is fixed to the pressure member 149 via the leading end electrode member 142, and the rear end side thereof is fixed to the pressure member 149 via the first rear end electrode member 143, the second rear end electrode member 144, the insulating ring 145 and the support member 150. Moreover, in this state, the pressure member 149 has already been fixed to the first leading end side housing 1311 and the diaphragm head 132. Therefore, the piezoelectric element 141 to be housed in the pressure member 149 is fixed to the diaphragm head 132 in a state in which a predetermined preload is imparted. Consequently, the positioning of the pressure member 149, the support member 150 and the piezoelectric element 141 with respect to the first leading end side housing 1311 and the diaphragm head 132 is performed.

Subsequently, into the support member 150 in a structure, to which components up until the support member 150 are attached, the first coil spring 146 is inserted from the rear end side, to be mounted onto the second convex part 144*c* of the second rear end electrode member 144 exposed inside the leading end side of the support member 150. Moreover, to the rear end side of the support member 150 in the above-described structure, the second coil spring 151 is inserted from the rear end side to be mounted. Further, into the first leading end side housing 1311 in the above-described structure, the second leading end side housing 1312 is screwed from the rear end side to be attached. Still further, into the second leading end side housing 1312, the first insulating member 161 and the second insulating member 162 are inserted in this order from the rear end side. With this, the first insulating member 161 is butted against the stepped part provided to the leading end side in the second leading end side housing 1312 and is positioned, and the second insulating member 162 is butted against the stepped part provided to the rear end side in the second insulating member 1312 and is positioned.

On the other hand, in a process different from the assembly of the above-described structure, into the leading end side of the holding member 148, the conduction member 147 is inserted from the leading end side. Moreover, to the rear end side of the holding member 148, the circuit board 153 including the ground plate 155 is attached. At this time, the rear end side convex part 147b of the conduction member 147 attached to the holding member 148 and the circuit board 153 are electrically connected. Then, into the housing member 152, the holding member 148, to which the conduction member 147 and the circuit board 153 (the ground plate 155) are mounted, is inserted from the rear end side with the conduction member 147 as the leading end side. At this time, the holding member 148 is inserted until the boundary portion between the cylindrical portion and the plate-like portion (the leading end side of the plate-like portion) in the holding member 148 butts against the inner circumferential surface of the second stepped part 152b provided to the housing member 152. With this, the leading end side of the cylindrical portion in the holding member 148 and the leading end side of the conduction member 147 exposed from the cylindrical portion in the holding member 148 (the leading end side concave part 147a) project toward the leading end side than the first cylindrical part 1521. Moreover, the inner circumferential surface of the housing member 152 and the rear end side of the ground plate 155 are brought into contact with each other.

Then, into the second leading end side housing 1312 in a structure, to which components up until the second insulating member 162 are attached, the housing member 152 including the conduction member 147, the circuit board 153 (the ground plate 155) and the holding member 148 is inserted from the rear end side with the first cylindrical part 1521 as the leading end side. At this time, the housing member 152 is inserted until the second stepped part 152b provided to the housing member 152 butts against the first insulating member 161 attached to the inside of the second leading end side housing 1312 (until the third stepped part 152c provided to the housing member 152 butts against the second insulating member 162 attached to the inside of the second leading end side housing 1312). With this, the rear end side of the second cylindrical part 1522 and the outer circumferential surface of the second stepped part 152b in the housing member 152 are brought into contact with the inner circumferential surface and the surface on the rear end side of the first insulating member 161. Moreover, the rear end side of the third cylindrical part 1523 and the outer circumferential surface of the third stepped part 152c in the housing member 152 are brought into contact with the inner circumferential surface and the surface on the rear end side of the second insulating member 162. On the other hand, the rear end side of the first coil spring 146 is inserted into the leading end side concave part 147a of the conduction member 147 and the rear end of the first coil spring 146 butts against the bottom portion of the leading end side concave part 147a. Moreover, the first cylindrical part 1521 of the housing member 152 is inserted into the rear end side of the second coil spring 151 and the rear end of the second coil spring 151 butts against the first stepped part 152a of the housing member 152. As a result, the first coil spring 146 and the second coil spring 151 are brought into a state of being contracted in the centerline direction as compared to a state before inserting the housing member 152 into the above-described structure.

Subsequently, into the second leading end side housing 1312 in a structure, to which components up until the housing member 152 are attached, the first rear end side housing 1331 and the third insulating member 163 are inserted from the rear end side and are attached. With this, the outer circumferential surface of the fourth cylindrical part 1524 in the housing member 152 is brought into contact with the inner circumferential surface of the third insulating member 163. Moreover, into the first rear end side housing 1331, the second rear end side housing 1332 is inserted from the rear end side.

Then, into the second rear end side housing 1332 in a structure, to which components up until the second rear end side housing 1332 are attached, the connection member 154, on the outer circumferential surface of which the O-ring 156 is mounted, is inserted from the rear end side with the board-side connector 154a as the leading end side. At this time, the O-ring 156 mounted on the connection member 154 enters inside the second rear end side housing 1332 to be brought into contact with the second rear end side housing 1332. Moreover, the circuit board 153 and the board-side connector 154a provided to the connection member 154 are electrically connected.

Finally, into the concave part 1311a of the first leading end side housing 1311 in a structure, to which components up until the connection member 154 are attached, the first sealing member 171 is attached and the second sealing member 172 is attached to the concave part 1312a of the second leading end side housing 1312.

Thus, assembly of the pressure detection device 20 is completed.

[Pressure Detection Operation by Pressure Detection Device]

Now, pressure detection operation by the pressure detection device 20 will be described.

When the internal combustion engine 10 is operating, a pressure generated inside the combustion chamber C (combustion pressure) is imparted to the pressure receiving surface 132a of the diaphragm head 132. In the diaphragm head 132, the pressure received by the pressure receiving surface 132a is transferred to the convex part 132d on the back side, and is further transferred from the convex part 132d to the leading end electrode member 142 via the insulating film 142a. Then, the pressure transferred to the leading end electrode member 142 acts on the piezoelectric element 141 held between the leading end electrode member 142 and the first rear end electrode member 143, to thereby, in the piezoelectric element 141, generate charges corresponding to the received pressure. The charges generated in the piezoelectric element 141 are supplied to the input signal terminal (not shown) of the circuit board 153 as the charge signal via the positive route. The charge signal supplied to the circuit board 153 is subjected to various kinds of processing in the circuits implemented onto the circuit board 153 to be converted into the output signal. Then, the output signal outputted from the circuit board 153 is transmitted to the outside (here, the connection cable 90 and the controller 80) via the connection member 154.

[Effect of the Exemplary Embodiment]

In the pressure detection device 20 of the exemplary embodiment, by fixing the positional relationship of the pressure member 149 and the support member 150 in the centerline direction, the piezoelectric element 141 is held between the pressure member 149 and the support member 150 to impart the predetermined load to the piezoelectric element 141. Then, the pressure member 149 to house the piezoelectric element 141 inside thereof, which was in the state of being in contact with the inner circumferential surface of the leading end side housing 131 via the insulating film 149a, is fixed to the leading end side housing 131 by use of the butting pipe 157. This makes it possible to electrically insulate the pressure member 149 and the leading end side housing 131 and to fix the piezoelectric element 141 to the housing part 130 (the leading end side housing 131) via the pressure member 149 and the support member 150 in the state of suppressing variations in load.

Moreover, in the pressure detection device 20 of the exemplary embodiment, the insulating film 142a is provided to the leading end side of the leading end electrode member 142 existing between the piezoelectric element 141 and the diaphragm head 132. This makes it possible to electrically insulate the leading end electrode member 142 and the diaphragm head 132.

Here, in the exemplary embodiment, there is provided the configuration in which the above-described leading end electrode member 142 and pressure member 149 also serve as the negative route of the piezoelectric element 141; by adopting the above-described configuration, it is possible to electrically insulate the negative route from the housing route including the leading end side housing 131 and the diaphragm head 132.

The pressure detection device 20 of the exemplary embodiment is attached to the internal combustion engine 10, and, when the internal combustion engine 10 is carried aboard a vehicle, noise of frequency of the order of kHz (hereinafter, referred to as low-frequency noise) generated in a horn, headlights, wipers comes into the cylinder head 13 of the internal combustion engine 10. Then, in the exemplary embodiment, since, of the pressure detection device 20, the housing part 130 composed of metal is attached to the cylinder head 13 composed of metal, the low-frequency noise coming into the cylinder head 13 also propagates to the housing part 130 of the pressure detection device 20.

Here, in the pressure detection device 20 of the exemplary embodiment, the housing route including the housing part 130 is electrically insulated from the positive route and the negative route from the piezoelectric element 141 to the circuit board 153. Therefore, the low-frequency noise propagated from the cylinder head 13 to the housing part 130 of the pressure detection device 20 becomes unlikely to be transferred to the circuit board 153 via the pressure member 149, the support member 150, the conduction member 147 and so forth. As a result, fluctuations (variations) in the potential in the circuit board 153 due to the low-frequency noise is suppressed, and therefore, it becomes possible to reduce fluctuations (variations) in the output signal outputted from the circuit board 153 to the outside (the controller 80 or the like).

Moreover, when the internal combustion engine 10 is carried aboard a vehicle, radio waves of the order of MHz used by mobile phones, radio, television and so forth usually fly around the vehicle. When the radio waves are emitted to the conduction member 147 provided to the pressure detection device 20, noise of frequency of the order of MHz (hereinafter, referred to as high-frequency noise) results in being transferred to the circuit board 153.

Here, in the pressure detection device 20 in the exemplary embodiment, by use of the pressure member 149 and the support member 150, the conduction member 147 is covered. Therefore, the radio waves emitted to the pressure detection device 20 from the outside are shielded by the pressure member 149 and the support member 150, to be less likely to be transferred to the conduction member 147. As a result, fluctuations (variations) in the potential in the circuit board 153 due to the high-frequency noise is suppressed, and therefore, it becomes possible to reduce fluctuations (variations) in the output signal outputted from the circuit board 153 to the outside.

Moreover, in the exemplary embodiment, by use of the housing member 152 made of metal, the circuit board 153 is covered. Therefore, the radio waves emitted to the pressure detection device 20 from the outside are shielded by the housing member 152, to be less likely to reach the circuit board 153. As a result, fluctuations (variations) in the potential in the circuit board 153 due to the high-frequency noise is suppressed, and therefore, it becomes possible to further reduce fluctuations (variations) in the output signal outputted from the circuit board 153 to the outside.

[Others]

Note that, in the exemplary embodiment, by providing the insulating film 142a to the leading end side of the leading end electrode member 142, the leading end electrode member 142 constituting the negative route and the diaphragm head 132 constituting the housing route are electrically insulated; however, the insulation method is not limited thereto. For example, between the leading end electrode member 142 and the diaphragm head 132, an insulating plate composed of a ceramic material having the insulating property and high resistance to heat, such as alumina, may be disposed.

Moreover, in the exemplary embodiment, by providing the insulating film 149a to part of the outer circumferential surface of the pressure member 149 (the middle cylindrical part 1492, the leading end stepped part 149b and the rear end stepped part 149c), the pressure member 149 is electrically insulated from the first leading end side housing 1311 and the butting pipe 157 constituting the housing route; however, the insulation method is not limited thereto. For example, between the pressure member 149 and the first leading end side housing 1311 and the butting pipe 157, it may be possible to dispose an insulating ring composed of a ceramic material having the insulating property and high resistance to heat, such as alumina, or to form an air gap.

Moreover, by disposing the first insulating member 161 between rear end side of the second cylindrical part 1522 and the second stepped part 152b in the housing member 152 and the inner circumferential surface of the second leading end side housing 1312, the second insulating member 162 between rear end side of the third cylindrical part 1523 and the third stepped part 152c in the housing member 152 and the inner circumferential surface of the second leading end side housing 1312, and the third insulating member 163 between the fourth cylindrical part 1524 in the housing member 152 and the first rear end side housing 1331, the housing member 152 constituting the negative route is electrically insulated from the leading end side housing 131 and the rear end side housing 133 constituting the housing route; however, the insulation method is not limited thereto. For example, it may be possible to form an insulating film on part of the outer circumferential surface of the housing member 152 by coating a ceramic material containing alumina, zirconia or the like and showing the insulating property, or to form an air gap between the housing member 152 and the leading end side housing 131 and the rear end side housing 133.

Further, in the exemplary embodiment, the first leading end side housing 1311 and the butting pipe 157 are fixed by use of the first welding part 158; however, the fixing method is not limited thereto, and, for example, both of them may be fixed by screwing or the like. Still further, in the exemplary embodiment, the pressure member 149 and the support member 150 are fixed by use of the second welding part 159; however, the fixing method is not limited thereto, and, for example, both of them may be fixed by screwing or the like.

Moreover, in the exemplary embodiment, the first rear end electrode member 143 and the second rear end electrode member 144 are disposed as separate members; however, disposition is not limited thereto, and, for example, it may be possible to replace the first rear end electrode member 143 and the second rear end electrode member 144 with a single member to be disposed.

Further, in the exemplary embodiment, the leading end electrode member 142 is not housed inside the insulating pipe 160; however, disposition is not limited thereto, and the leading end electrode member 142 may be housed inside the insulating pipe 160.

Still further, in the exemplary embodiment, the description is given by taking the case in which the piezoelectric element 141 is used as the detection element for pressure in the pressure detection device 20 as an example; however, the detection element is not limited thereto, and, for example, a strain gage, a spaced electrode or the like may be used.

REFERENCE SIGNS LIST

1 . . . Pressure detection system
10 . . . Internal combustion engine
20 . . . Pressure detection device
30 . . . Detection part
31 . . . Leading end side housing
32 . . . Diaphragm head
33 . . . Piezoelectric element
34 . . . Insulating plate
35 . . . Leading end electrode member
36 . . . Rear end electrode member
37 . . . First pressure member
38 . . . Second pressure member
39 . . . Support member
40 . . . Insulating pipe
41 . . . First insulating ring
42 . . . Second insulating ring
43 . . . Third insulating ring
44 . . . Fourth insulating ring
45 . . . Fifth insulating ring
50 . . . Processing part
51 . . . Rear end side housing
52 . . . Connection member
53 . . . Conduction member
54 . . . Covering member
55 . . . Buffer member
56 . . . Housing member
57 . . . Circuit board
58 . . . Holding member
60 . . . Housing
70 . . . Shielding body
80 . . . Controller
81 . . . Power supply part
82 . . . ECU (Engine Control Unit)
83 . . . Device housing
90 . . . Connection cable
100 . . . Battery
130 . . . Housing part
131 . . . Leading end side housing
132 . . . Diaphragm head
133 . . . Rear end side housing
140 . . . Detection mechanism part
141 . . . Piezoelectric element
142 . . . Leading end electrode member
142a . . . Insulating film
143 . . . First rear end electrode member
144 . . . Second rear end electrode member
145 . . . Insulating ring
146 . . . First coil spring
147 . . . Conduction member
148 . . . Holding member
149 . . . Pressure member
149a . . . Insulating film
150 . . . Support member
151 . . . Second coil spring
152 . . . Housing member
153 . . . Circuit board
154 . . . Connection member
155 . . . Ground plate
156 . . . O-ring
157 . . . Butting pipe
158 . . . First welding part
159 . . . Second welding part
160 . . . Insulating pipe
161 . . . First insulating member
162 . . . Second insulating member
163 . . . Third insulating member
170 . . . Sealing part
171 . . . First sealing member
172 . . . Second sealing member

The invention claimed is:

1. A pressure detection device comprising:
a detection element that detects a change in pressure;
a first housing that has conductivity and houses the detection element inside thereof;
a second housing that has conductivity and houses the first housing inside thereof, wherein
the first housing is electrically insulated from the second housing; and
an insulating member that has an insulating property and is disposed between the first housing and the second housing to electrically insulate the first housing and the second housing, wherein
the first housing holds the detection element from a leading end side and a rear end side of the first housing to impart a load to the detection element, and wherein
the pressure detection device further comprises:
a deformation member that is attached to a leading end side of the second housing and is deformed upon receiving pressure from outside;
an insulating transmission member that has an insulating property and is provided between the deformation member and the detection element inside the second housing, and transmits the pressure acting on the deformation member to the detection element; and
a fixing member that fixes the first housing to the second housing in a state where the first housing is electrically insulated from the deformation member and the second housing.

2. The pressure detection device according to claim 1, further comprising:
a processing circuit that applies electrical processing to a detection signal detected by the detection element, wherein
the processing circuit is housed in the first housing, and a ground of the processing circuit and a ground of the detection element are connected to the first housing.

3. The pressure detection device according to claim 2, further comprising:
a DC suppressing part that connects the ground of the processing circuit and the first housing while suppressing passage of DC current.

4. The pressure detection device according to claim 1, wherein
the second housing has the conductivity higher than that of the first housing, and the first housing has resistance to acids higher than that of the second housing.

5. The pressure detection device according to claim 1, wherein
the first housing shows a cylindrical shape and includes a projection part that projects outward on an outer circumferential surface thereof, and
the fixing member holds the projection part with an inner circumferential surface of the second housing via the insulating member to fix the first housing to the second housing.

6. The pressure detection device according to claim 1, wherein
the first housing includes:
a first imparting member that is disposed outside the detection element, electrically connected to a leading end side of the detection element and electrically insulated from a rear end side of the detection element, to thereby impart the load from the leading end side of the detection element; and
a second imparting member that is provided on a rear end side of the first imparting member, electrically connected to the first imparting member, and electrically insulated from the detection element, to thereby impart the load from the rear end side of the detection element by being fixed to the first imparting member.

7. The pressure detection device according to claim 1, further comprising:
a conduction member that is housed inside the first housing and is electrically connected to a rear end side of the detection element, to thereby conduct a detection signal outputted from the detection element, wherein
the first housing is electrically connected to a leading end side of the detection element and is electrically insulated from the conduction member, to thereby serve as a ground of the detection element.

8. A pressure detection system comprising:
a detection device including: a detection element that detects a change in pressure; a processing circuit that applies electrical processing to a detection signal outputted by the detection element; an electrical conduction member that has conductivity and is disposed to cover at least a part of the processing circuit, and is connected to a ground of the processing circuit; and a housing that houses the detection element, the processing circuit and the electrical conduction member, the housing being electrically insulated from the detection element, the processing circuit and the electrical conduction member, and mounted to a grounded conductor in a state of being in contact with the conductor; and
a supplying and processing device that is connected to the detection device via a supply line for supplying power-supply voltage to the processing circuit, a transmission line for transmitting an output signal outputted from the processing circuit and a ground line to be connected to the electrical conduction member or the ground of the processing circuit, to supply the power-supply voltage to the detection device and to apply processing to the output signal inputted from the detection device.

9. A pressure detection system comprising:
a detection device including: a detection element that detects a change in pressure; a processing circuit that applies electrical processing to a detection signal outputted by the detection element; a first housing that has conductivity and is disposed to cover at least a part of the processing circuit, and is connected to a ground of the processing circuit; a second housing that has conductivity and houses the first housing, and is mounted in a state of being in contact with a grounded conductor; and an insulating member that has an insulating property and is disposed between the first housing and the second housing to electrically insulate the first housing and the second housing; and
a supplying and processing device that is connected to the detection device via a supply line for supplying power-supply voltage to the processing circuit, a transmission line for transmitting an output signal outputted from the processing circuit and a ground line to be connected to the first housing or the ground of the processing circuit, to supply the power-supply voltage to the detection device and to apply processing to the output signal inputted from the detection device.

* * * * *